(12) United States Patent
Rosen et al.

(10) Patent No.: US 12,729,033 B2
(45) Date of Patent: Sep. 8, 2026

(54) MODULAR TRAY AND TRAY ASSEMBLIES THEREFROM

(71) Applicant: JUST GREENS, LLC, Newark, NJ (US)

(72) Inventors: Mark Ira Rosen, Franklin, NJ (US); Nicholas Philip Robert Barclay, New York, NY (US); Justin Robert Zabilansky, Danville, VA (US); John James Tarter, Henderson, NV (US)

(73) Assignee: New AeroFarms, Inc., Ringgold, VA (US)

( * ) Notice: Subject to any disclaimer, the term of this patent is extended or adjusted under 35 U.S.C. 154(b) by 0 days.

(21) Appl. No.: 18/035,248

(22) PCT Filed: Nov. 3, 2021

(86) PCT No.: PCT/US2021/057923
§ 371 (c)(1),
(2) Date: May 3, 2023

(87) PCT Pub. No.: WO2022/098775
PCT Pub. Date: May 12, 2022

(65) Prior Publication Data

US 2024/0010383 A1 Jan. 11, 2024

Related U.S. Application Data

(60) Provisional application No. 63/110,227, filed on Nov. 5, 2020.

(51) Int. Cl.
*B65D 1/36* (2006.01)
*A01G 31/02* (2006.01)

(52) U.S. Cl.
CPC .............. *B65D 1/36* (2013.01); *A01G 31/02* (2013.01)

(58) Field of Classification Search
CPC . B65D 1/36; B65D 1/38; B65D 11/14; B65D 19/0002; B65D 21/0215; B65D 21/0209
(Continued)

(56) References Cited

U.S. PATENT DOCUMENTS 4,711,355 A * 12/1987 Veenman ........... B65D 21/0226 206/821
4,756,119 A * 7/1988 Chabot ................ A01G 9/0299 108/127

(Continued)

FOREIGN PATENT DOCUMENTS

CN 105309223 A 2/2016
WO 0200515 A1 1/2002

(Continued)

OTHER PUBLICATIONS

International Search Report and Written Opinion from related International Patent Application No. PCT/US2021/057923 issued Feb. 3, 2022.

(Continued)

*Primary Examiner* — Robert Poon
(74) *Attorney, Agent, or Firm* — McCarter & English, LLP

(57) ABSTRACT

Embodiments of the disclosure relate to tray modules and tray assemblies made from interconnected tray modules. The modular tray assemblies can be used in indoor farming with a soilless growth medium to germinate seeds, develop plants from the germinated seeds, and harvest the developed plants. The tray modules making up a tray assembly are interchangeable and can be made from the same mold design. This can reduce production costs for making tray modules and can reduce the inventory of replacement parts needed to repair tray assemblies.

20 Claims, 15 Drawing Sheets

(58) Field of Classification Search
USPC ....... 206/562, 423, 765, 561, 511, 733, 599, 206/443, 512; 211/71.01, 74, 133.1
See application file for complete search history.

(56) References Cited

U.S. PATENT DOCUMENTS

| | | | | |
|---|---|---|---|---|
| 5,426,890 | A | 6/1995 | Dummen | |
| 5,809,905 | A * | 9/1998 | John | B65D 19/0075 108/56.1 |
| 5,816,406 | A | 10/1998 | Jupille et al. | |
| 6,820,757 | B2 * | 11/2004 | Craft | A47B 96/021 211/188 |
| 10,182,537 | B1 | 1/2019 | Buelow | |
| 2007/0137101 | A1 | 6/2007 | van Heugten | |
| 2016/0007737 | A1 * | 1/2016 | Clark | B65D 25/30 211/186 |
| 2020/0008376 | A1 | 1/2020 | Harwood | |

FOREIGN PATENT DOCUMENTS

| | | | |
|---|---|---|---|
| WO | 2004095912 | A2 | 11/2004 |
| WO | 20200112610 | A1 | 6/2020 |

OTHER PUBLICATIONS

Search Report and Examination Report from related UAE Application No. P6001020/2023 issued Nov. 21, 2025.

* cited by examiner

MODULAR TRAY AND TRAY ASSEMBLIES THEREFROM

CROSS-REFERENCE TO RELATED APPLICATIONS

This patent application is a 35 U.S.C. § 371 National Stage filing based on International Application No. PCT/US2021/057923, filed on Nov. 3, 2021, which application claims priority benefit to U.S. Provisional Patent Application No. 63/110,227, filed on Nov. 5, 2020, the disclosures of which are incorporated herein by reference in their entireties.

TECHNICAL FIELD

This disclosure relates generally to tray modules and tray assemblies comprising the modules as well as methods of making and using them with soilless growth media to support seed germination, plant development, harvest, and cleaning for indoor farming.

BACKGROUND

U.S. Pat. Appln. Pub. No. 20200008376A1 to Harwood discloses that a single piece of fabric can be fitted with grommets and used to attach the fabric to a frame which has cross members to support the cloth, these trays can be implemented for seeding and harvesting, and these trays can be set on rails on each side of the chamber and pulled along as they are linked together like a chain.

U.S. Pat. No. 5,809,905 to John et al. discloses a modular system that incorporates a lattice structure and interlocking elements formed of plastic or other material. However, John et al. describes a separate, non-integrally mounted structure (center locking ring 46, FIG. 1) to secure the modular elements to one another. Further, John et al. is not expandable beyond the predetermined size shown. Further, the interlocking elements on the sides of the modules in John et al. can only mate with suitable receiving features on other modules making the modules in an assembly only partially interchangeable, requiring more than one mold to make the interlocking elements which adds cost for the extra mold and requires additional separate tray modules in inventory.

International Patent Application WO2020112610A1 to Harwood and Zeiba disclose a soilless growth medium fabric with fixtures that can be grommets, hooks, snaps and the like that can be used for attaching the fabric to a tray. The tray or frame can refer to any size or shaped support for the soilless growth media of the disclosure. The tray can be positioned or mounted in a growth chamber and can include cross members to support the growth medium and frame structure. A tray or frame with a soilless growth medium position thereon can be used to germinate seeds and develop plants. In some embodiments a frame with an optional wire insert, lattice, or support can be used as a tray to support the soilless growth media.

Thus, a need still exists for improved frames for use with soilless growth media in indoor farming.

SUMMARY

The embodiments disclosed herein meets these and other needs by providing tray modules that can be joined to create larger tray assemblies. The tray modules can be flat and the tray assemblies can be built from them such that the tray assembly remains flat, supports seed germination and plant development, and can be used for harvesting plants. The flat top surface of the tray modules enables the tray modules and tray assemblies to be passed through automated harvesters and the plants can be cut at a substantially constant height with respect to the top surface.

The tray modules can be made from a single mold design which reduces manufacturing costs and allows for easy replacement of tray sections that may become damaged in tray assemblies during use in an indoor farming facility. The modularity of the tray assemblies can eliminate waste from the disposal of partially damaged whole tray assemblies, allows a single mold to be used to make the modules, and can simplify replacement part storage and inventory to a single module type.

The tray modules have stand-off features that can enable secure stacking and spacing of tray modules and tray assemblies for seed germination. The stand-off features are non-nesting and easy to clean, and can further support the structure and flatness of the top surface of the modules or assemblies.

The tray modules include connecting features that can be used to secure modules to one another and build larger tray assemblies. The connecting features included with the tray sides of the tray modules are easily accessible from the tray sides between the top and bottom surfaces of the modules which can facilitate the addition or removal of tray modules from tray assemblies and optionally includes the ability to add or remove support strips between joined tray modules. Tray modules and tray assemblies can include ribs that can provide openings between the top and bottom surfaces for plant roots. These openings formed by the ribs can be distributed across the tray modules and tray assemblies, have one or more walls with reduced thickness compared to the height of tray sides as measured between the tray top surface and wall bottom surfaces, and can eliminate the need for center support structures that contact a container bottom or lower surface. The openings between the top and bottom surfaces for roots with reduced height or thickness compared to the height of the tray side can improve access to nutrient solution for young and short seedling roots and can reduce shadowing of roots by the tray module openings.

Embodiments of the disclosure relate to modular trays and tray assemblies made from connected modular trays. The modular trays and tray assemblies can be used for indoor farming with soilless grow media to germinate seeds, develop plants from the germinated seeds, and harvest the developed plants atop the trays and assemblies.

DETAILED DESCRIPTION

Figure 1:
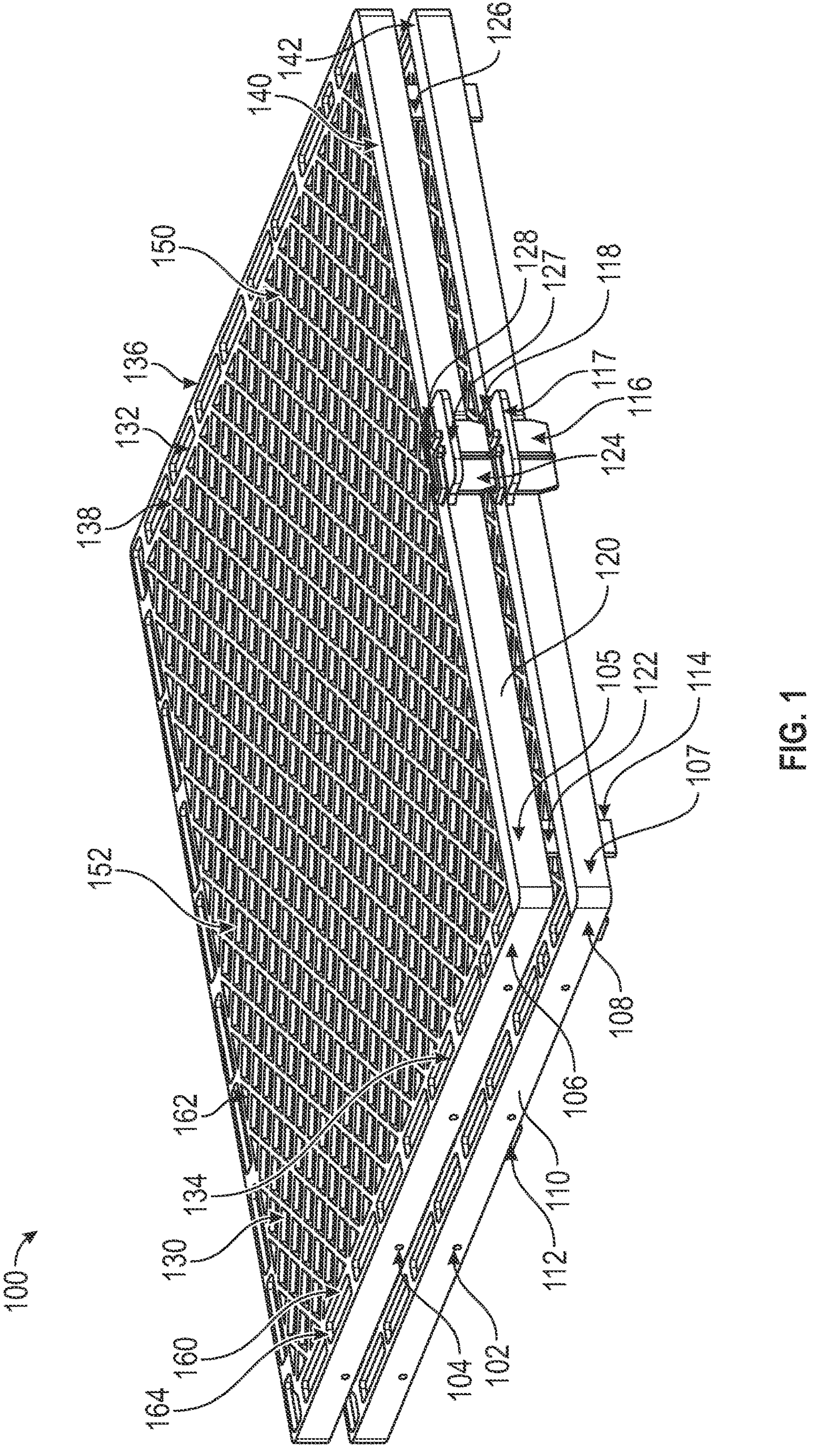
FIG. 1 is a schematic illustration of tray modules that are stacked.

In the following description, it is understood that terms such as "top," "bottom," "outward," "inward," or "first", "second", "third", "fourth" and the like are words of convenience and are not to be construed as limiting terms. Reference will now be made in detail to embodiments of the disclosure, which are illustrated in the accompanying figures and examples. Referring to the drawings in general, it will be understood that the illustrations are for the purpose of describing particular embodiments of the disclosure and are not intended to limit the same.

Whenever a particular embodiment of the disclosure is said to comprise or consist of at least one element of a group and combinations thereof, it is understood that the embodiment may comprise or consist of any of the elements of the group, either individually or in combination with any of the other elements of that group.

In embodiments of the disclosure, the term "developing plant(s)" can refer to one or more germinating seeds, one or more seedlings with or without true leaves, one or more growing plants, or any combination of these that are on a generally top surface of a growth medium.

Figure 2:
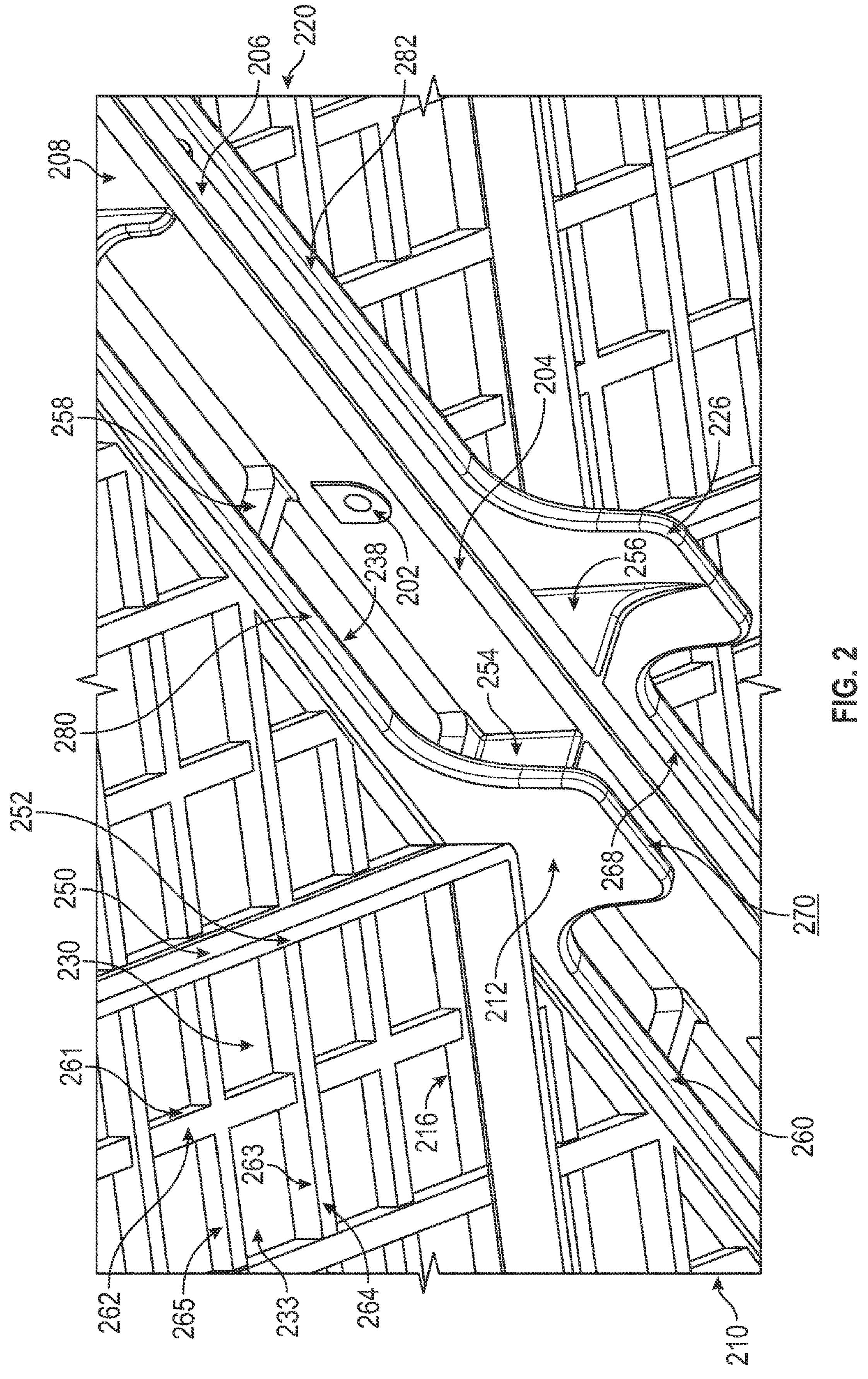
FIG. 2 is a schematic illustration of portions of two joined tray modules.
Figure 3:
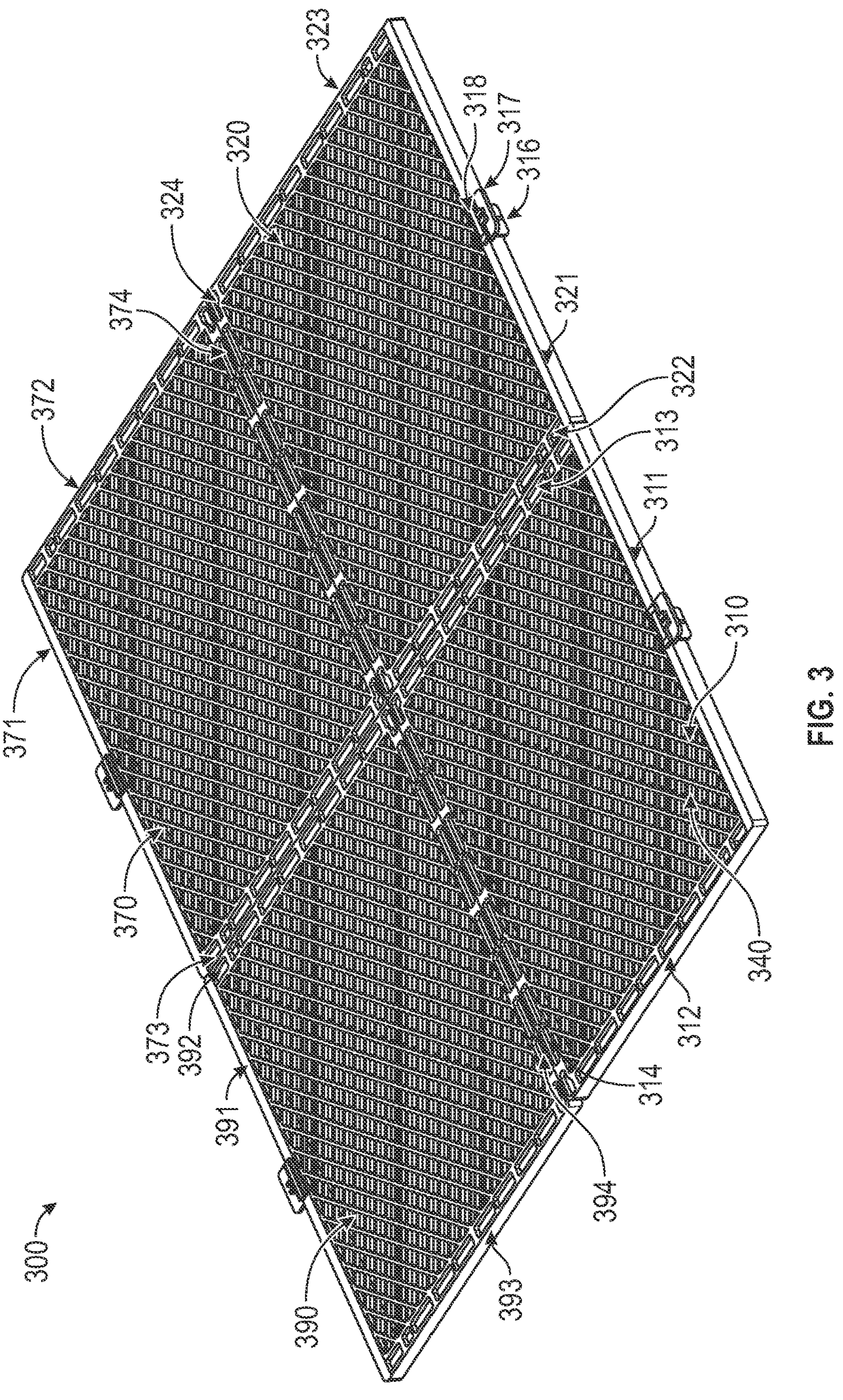
FIG. 3 is a schematic illustration of tray modules linked or joined together to form a tray assembly.
Figure 7:
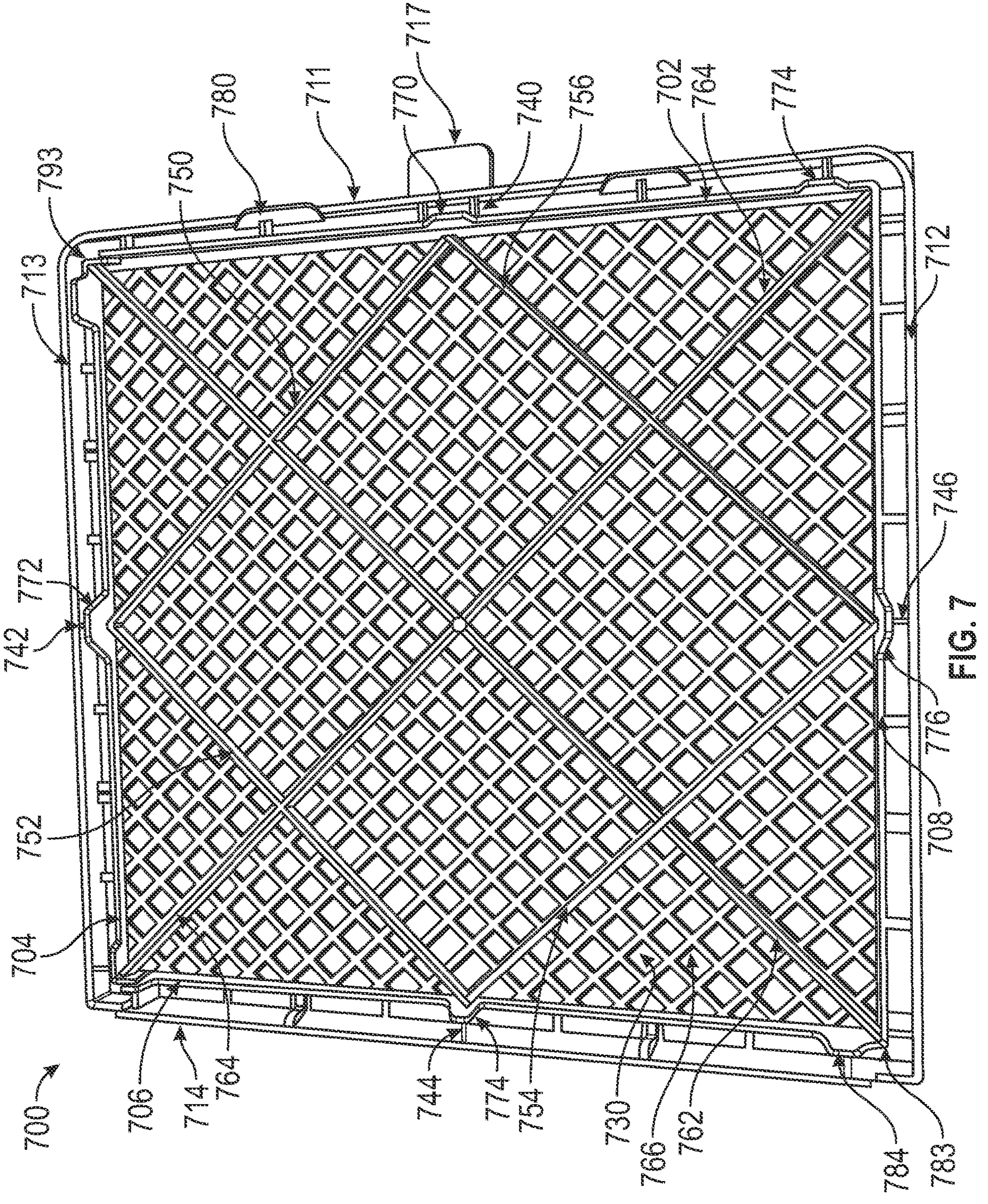
FIG. 7 illustrates features of a tray module.

A tray module such as 110, 120, 210 and 220 (joined tray modules), or 700, illustrated in FIG. 1, FIG. 2, and FIG. 7 respectively, can include a top surface 140, one or more bottom surfaces such as 260, 262, and/or 264, and openings like 130 or 230 with walls between the top surface and the bottom surface. As illustrated in FIG. 3 the tray module can include tray sides such as first tray side 311, second tray side 312, third tray side 313, and fourth tray side 314 extending below the top surface 340 and connected thereto. The tray sides 311, 312, 313, and 314 can form a tray side perimeter. The tray sides, e.g. 208, can have a tray side bottom edge surface, e.g. 204, that extends away from the top surface of the tray module. The height of the tray side can be measured from the top surface of the tray module to the tray side bottom edge. The tray sides can include a first tray side, e.g. 311, 711), a second tray side, e.g. 312, 712, a third tray side, e.g. 313, 713, and a fourth tray side (e.g. 314, 714). The second tray side and the third tray side can be opposite one another and the fourth tray side can be opposite the first tray side. The second tray side, the third tray side, and the fourth tray side can have one or more connecting features such as but not limited to 102, 104, 202, and the like. The tray module can include one or more stand-offs illustrated by 112, 114, 116, 772, 780, within the tray side perimeter. The stand-offs can extend away from the top surface and beyond the tray side bottom edge surface, and the stand-offs can have a stand-off bottom edge surface 270. The stand-off bottom surface(s) for a tray module can all be the same distance from the top surface which can enable even stacking of tray modules and tray assemblies. The tray module can include two or more structures such as but not limited to 150, 152, 750, 752, and the like that can include the top surface and that can have a straight line portion that can join adjacent inner tray sides, opposite corners of inner tray sides, or any combination of these. The structures like 150, 152, 750, 752, etc. that include the top surface can form openings such as 130, 230, or 233 that have walls extending between the top surface and the bottom surface of the tray module. The wall thickness of the opening can be measured from the tray top surface to any bottom surface of the opening. The wall thickness of the opening is less than the thickness of any tray side measured from the tray top surface to the tray side bottom edge surface. The tray module can further include one or more stand-off engagement structures illustrated by but not limited to 118, 128, 318, and the like. Stand-off engagement structures can include a raised lip that can be on the top surface of the tray assembly. The raised lip of the engagement structure can retain the position of a stand-off on the top surface of a tray module or tray assembly. The stand-off engagement structures can be aligned with the bottom surface of one or more stand-offs (e.g. 116, 124, as depicted in FIG. 1). The stand-off engagement structures have an opening that can retain the stand-off bottom surface of one or more stand-offs from another tray module or tray assembly and can facilitate stacking of tray modules and/or tray assemblies.

In some embodiments, the tray module of can further include inner tray sides such as but not limited to 138, 160, 162, 702, 704, 706, 708 as illustrated in FIG. 1 and FIG. 7. The inner tray sides can extend below the top surface of the tray. Each inner tray side can be parallel to a tray side. The inner trays sides can form an inner tray side perimeter, and the inner tray side perimeter can be smaller than the tray side perimeter. As shown in FIG. 7, the inner tray sides can include a first inner tray side 702, a second inner tray side 704, a third inner tray side 706, and a fourth inner tray side 708. The first inner tray side 702 can be joined to the first tray side, the first inner tray side can include one or more of the stand-offs (e.g. 770, 774) that extend away from or beyond the bottom edge of the first tray side. Optionally the first inner tray side can include an opening (not shown) opposite connecting features of the first tray side. The second inner tray side can include an opening (e.g. 280, 680) opposite the connecting features of the second tray side and the second inner tray side 708 can be joined to the second tray side 712. The second inner tray side can include one or more of the stand-offs (e.g. 776) that extend away from or beyond the bottom edge of the second tray side. The third inner tray side 704 can include an opening (e.g. 280, 680) opposite the connecting features of the third tray side 713 and the third inner tray side can be joined to the third tray side. The third inner tray side can include one or more of the stand-offs 772 that extend away from or beyond the bottom edge of the third tray side. The fourth inner tray side 706 can include an opening (e.g. 280, 680) opposite the connecting features of the fourth tray side 714 and the fourth inner tray side can be joined to the fourth tray side. The fourth inner tray side can include one or more of the stand-offs (e.g. 774) that extend away from or beyond the bottom edge of the fourth tray side.

Figure 12A:
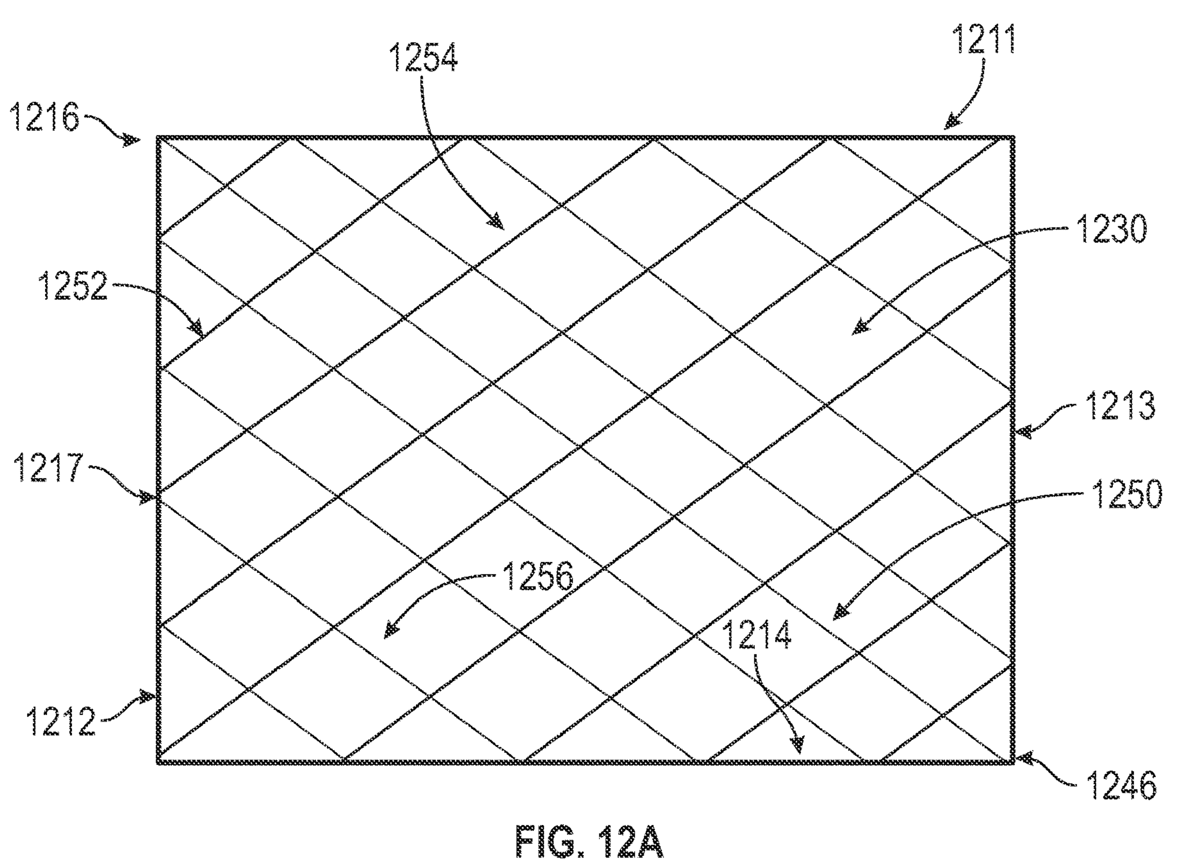
FIG. 12A-C illustrate different configurations of tray modules having two or more structures comprising the top surface that can include straight line portions joined to various tray sides, joined to corners of various tray sides, or combinations of these.
Figure 12B:
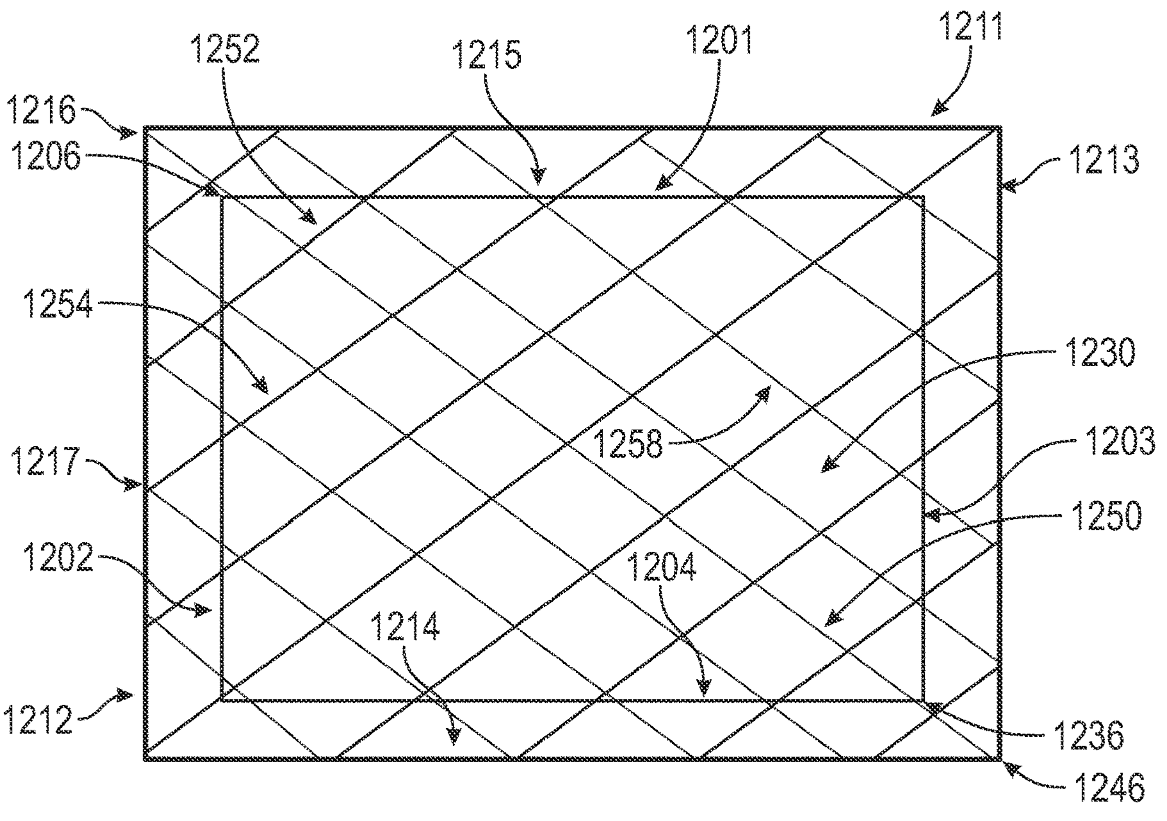
Figure 12C:
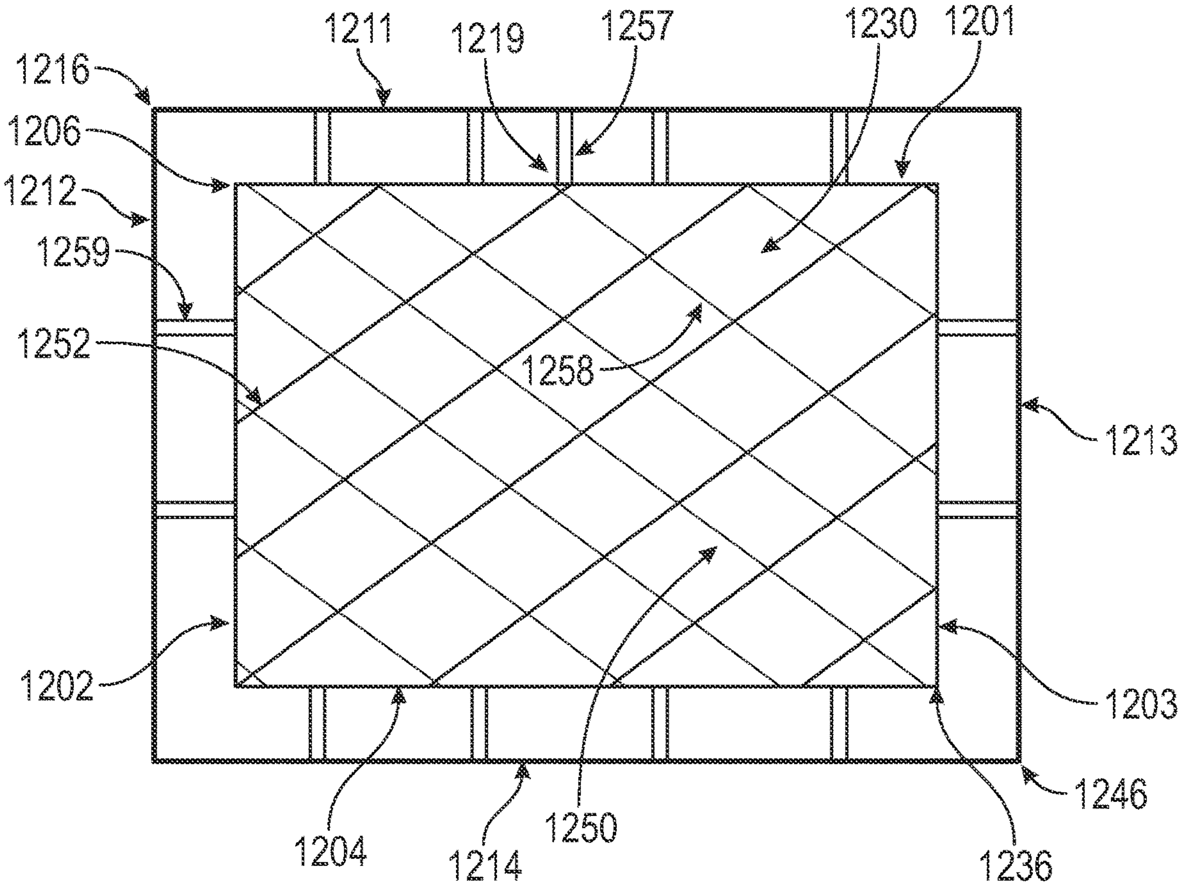

With reference to FIG. 7 and FIGS. 12A-C, in some embodiments of the tray module of the disclosure, two or more structures including the top surface that have the straight line portions such as but not limited to 750, 752, 754, and 762, or 1250, 1252, and 1254 can be: i) joined to adjacent tray sides such 1211 and 1212, joined to diagonally opposite corners formed by adjacent tray sides such 1216 and 1246, or any combination of these (e.g. FIG. 12A); ii) joined to adjacent tray sides 1211 and 1212 and adjacent inner tray sides 1201 and 1202, joined to diagonally opposite corners 1216 and 1246 of adjacent tray sides and diagonally opposite corners 1206 and 1236 of adjacent inner tray sides, or any combination of these (e.g. FIG. 12B); or, iii) joined to adjacent inner tray sides such as 706 and 704, or 1201 and 1202, diagonally opposite corners of adjacent inner tray sides such as 783 and 793, or 1206 and 1236, or any combination of these, and comprise gussets such as 742 and 744, or 1257 and 1259 joining the inner tray sides to the tray sides (e.g. FIG. 7 and FIG. 12C). In some embodiments of the disclosure a gusset that joins the tray side and the inner tray can be substantially perpendicular to the tray side and the inner tray side.

The tray module in embodiments of the disclosure can have stand-offs such as 112 and 780 that can be non-nesting. Non-nesting stand-offs can be solid and made thinner and smaller than nesting stand-offs which have hollow portions. The solid structure of the non-nesting stand-offs in embodiments of the disclosure can reduce crevices that can accumulate or trap harvest debris therein and thereby reduce cleaning costs and food safety concerns.

The tray module in embodiments of the disclosure can have two or more structures (e.g. 754, 762, and 766 in FIG. 7 or 1252, 1254 in FIG. 12) comprising the top surface that spans directly between adjacent inner tray sides and that can form openings like 730 and 1230 with walls that span between the top surface and the bottom surface. In some embodiments of the tray module of the disclosure, the two or more structures comprising the top structure (e.g. 752, 754) can have continuous ribs joined to the inner tray sides (e.g. 704, 706) at the stand-offs (e.g. 772, 774) and the stand-off can be joined to a gusset (e.g. 742, 744) that is joined to a tray side (e.g. 713, 714).

Figure 9:
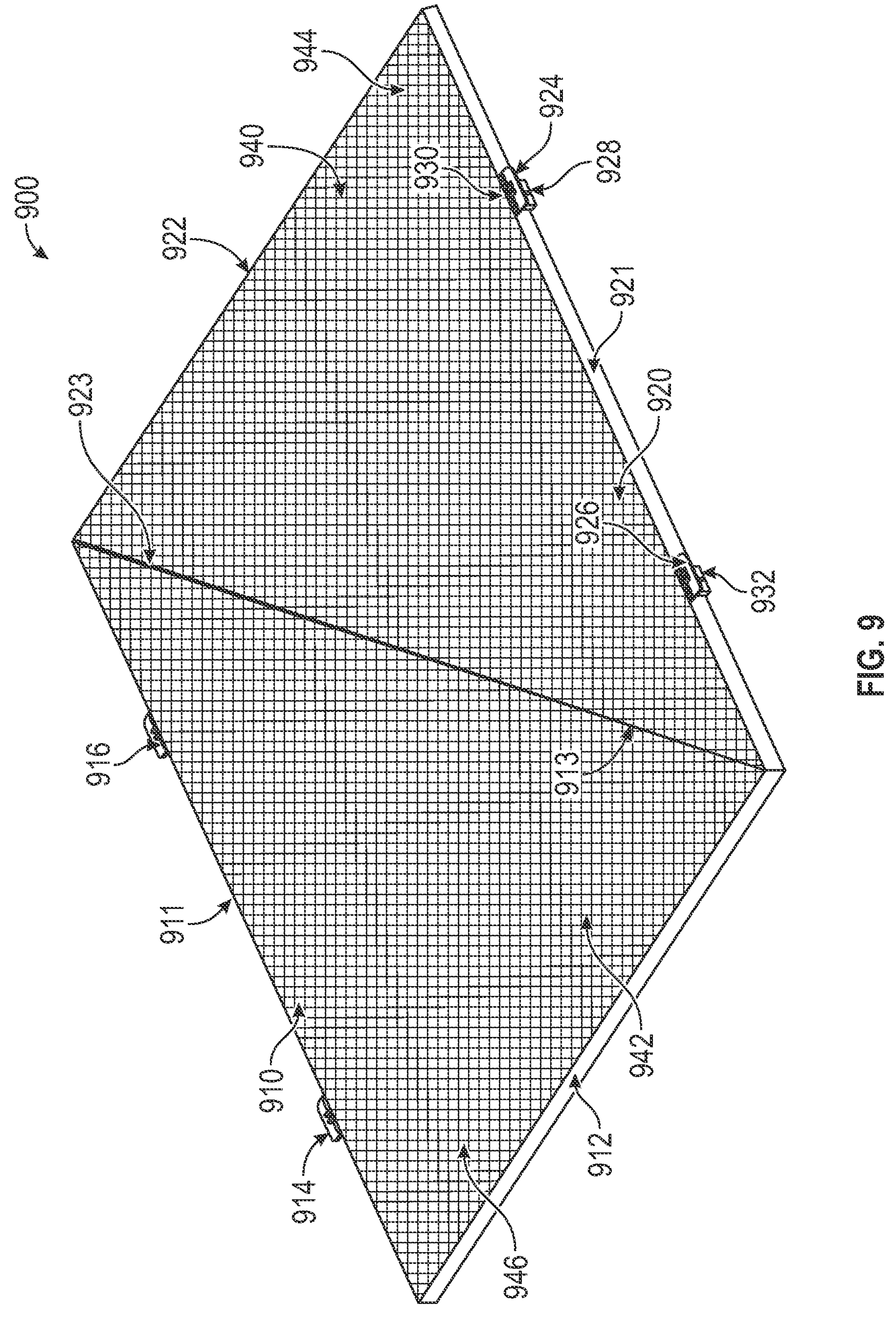
FIG. 9 is a schematic illustration of an embodiment of a tray assembly.
Figure 13A:
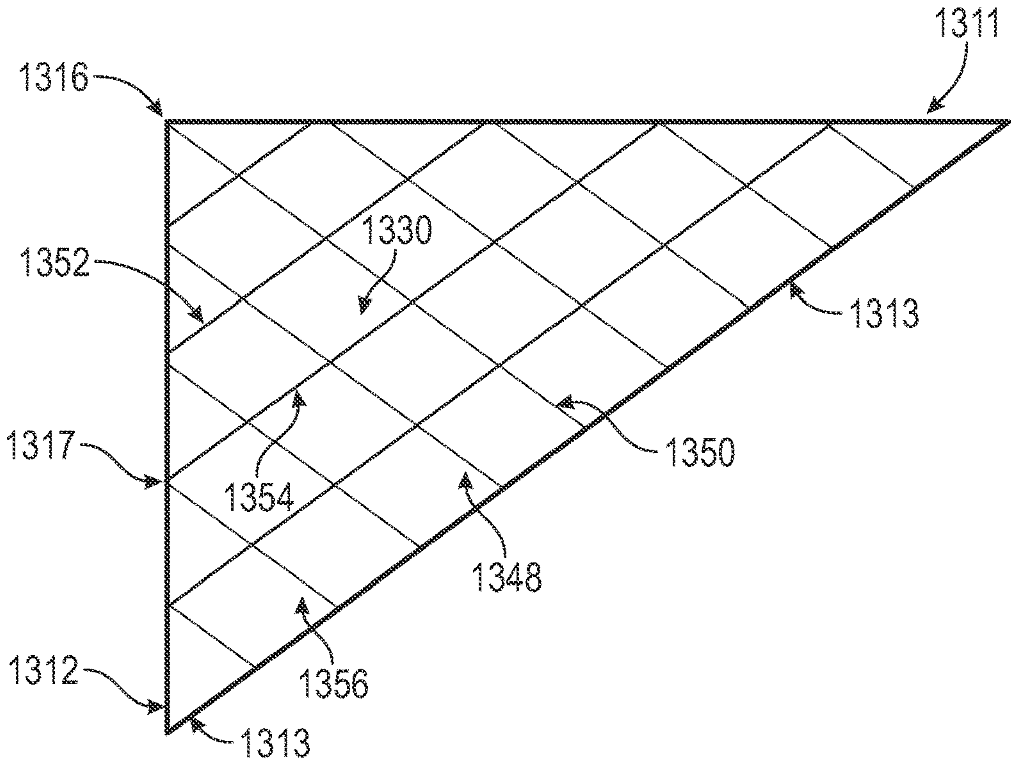
FIG. 13A-D illustrate different configurations of triangular shaped tray modules having two or more structures comprising the top surface that can include straight line portions joined to various tray sides, joined to a corner between various tray sides and an opposite tray side, or combinations of these.

In an embodiment of the disclosure a tray assembly 900 that includes two tray modules 910 and 920 joined together is illustrated in FIG. 9. Each tray module can include a top surface (e.g. 944, 946), bottom surface, and openings (e.g. 940, 942) with walls between the top surface and the bottom surface. The tray modules 910 and 920 can have tray sides (e.g. 911, 912, 913, and 921, 922, 923) extending below the respective top surfaces and the tray sides can be connected to the top surface. The top surface can have a triangular shape as illustrated in FIG. 9, wherein the tray sides form a triangle with a tray side perimeter. Each of the tray modules can include a first tray side (e.g. 911, 921), a second tray side (e.g. 912, 922), and a third tray side (e.g. 913, 923). The first tray side (e.g. 911, 921) is adjacent and connected to the second tray side (e.g. 912, 922), and the third tray side (e.g. 913, 923) spans between the first tray side and the second tray side. The second tray side and the third tray side can include connecting features (not shown) and one or more stand-offs within the tray side perimeter (not shown). The module stand-offs can extend away from the top surface and beyond a bottom edge of the tray sides, and the stand-offs can have a bottom edge surface. The stand-off bottom surface for each of the stand-offs of a tray assembly 900 can be the same distance from the top surface. As illustrated in FIGS. 13A, the tray module can include two or more structures comprising the top surface that have a straight line portion that joins adjacent tray sides (e.g. 1352, 1354), a corner (1316) and an opposite tray side (1313), or any combination of these. The structures (e.g. 1350, 1352, 1354) comprising the top surface form the openings 1330 with walls between the top surface and the bottom surface. The top surface can include one or more stand-off engagement structures (e.g. 930), the stand-off engagement structures can be aligned with the bottom edge surface of the one or more stand-offs (e.g. 928). The stand-off engagement structures can retain the bottom edge surface of the one or more stand-offs from another tray module or tray assembly. The stand-off engagement structures can have an opening that accommodates the stand-off.

In some embodiments of a triangular shaped tray module, the tray module can further include inner tray sides (e.g. 1301, 1302 in FIG. 13B) extending below the top surface of the tray module and can be connected to the top surface. The inner trays sides form an inner tray side perimeter and the inner tray side perimeter is smaller than the tray side perimeter. Each inner tray side can be parallel to a tray side. The inner tray sides can include a first inner tray side 1301, a second inner tray side 1302, and a third inner tray side 1303. The first inner tray side can be joined to the first tray side and the first inner tray side can include one or more of the stand-offs (not shown) that extend away from or beyond the bottom edge of the first tray side. Optionally the first inner tray side can include an opening (not shown) opposite connecting features of the first tray side. The second inner tray side 1302 can include an opening opposite the connecting features of the second tray side and the second inner tray side can be joined to the second tray side. The second inner tray side can include one or more of the stand-offs that extend away from or beyond the bottom edge of the second tray side. The third inner tray side 1303 can include an opening opposite the connecting features of the third tray side and the third inner tray side can be joined to the third tray side. The third inner tray side can include one or more of the stand-offs that extend away from or beyond the bottom edge of the third tray side.

In some embodiments depicted in FIGS. 13A-D the tray module can further include two or more structures (e.g. 1350, 1352, 1354) that can include the top surface and have a straight line portion that can be: i) joined to adjacent tray sides (1311 and 1312), joined to a corner 1316 and the opposite tray side (1313), or any combination of these as illustrated in FIG. 13A; ii) joined to adjacent tray sides (1311 and 1312) and adjacent inner tray sides (1301 and 1302), joined to inner tray side corner 1306 and tray side corner 1316 and opposite inner tray side (1303) and opposite tray side 1313, or any combination of these as illustrated in FIG. 13 B; or, iii) joined to adjacent inner tray sides 1301 and 1302, joined to the adjacent inner tray side corner 1306 and opposite inner tray side 1303 (FIG. 13 C) or opposite tray side 1313 (FIG. 13 D), or any combination of these and one or more gussets like 1366 or 1368 joining the inner tray sides to the tray sides as illustrated in FIG. 13 C and FIG. 13 D.

Figure 5:
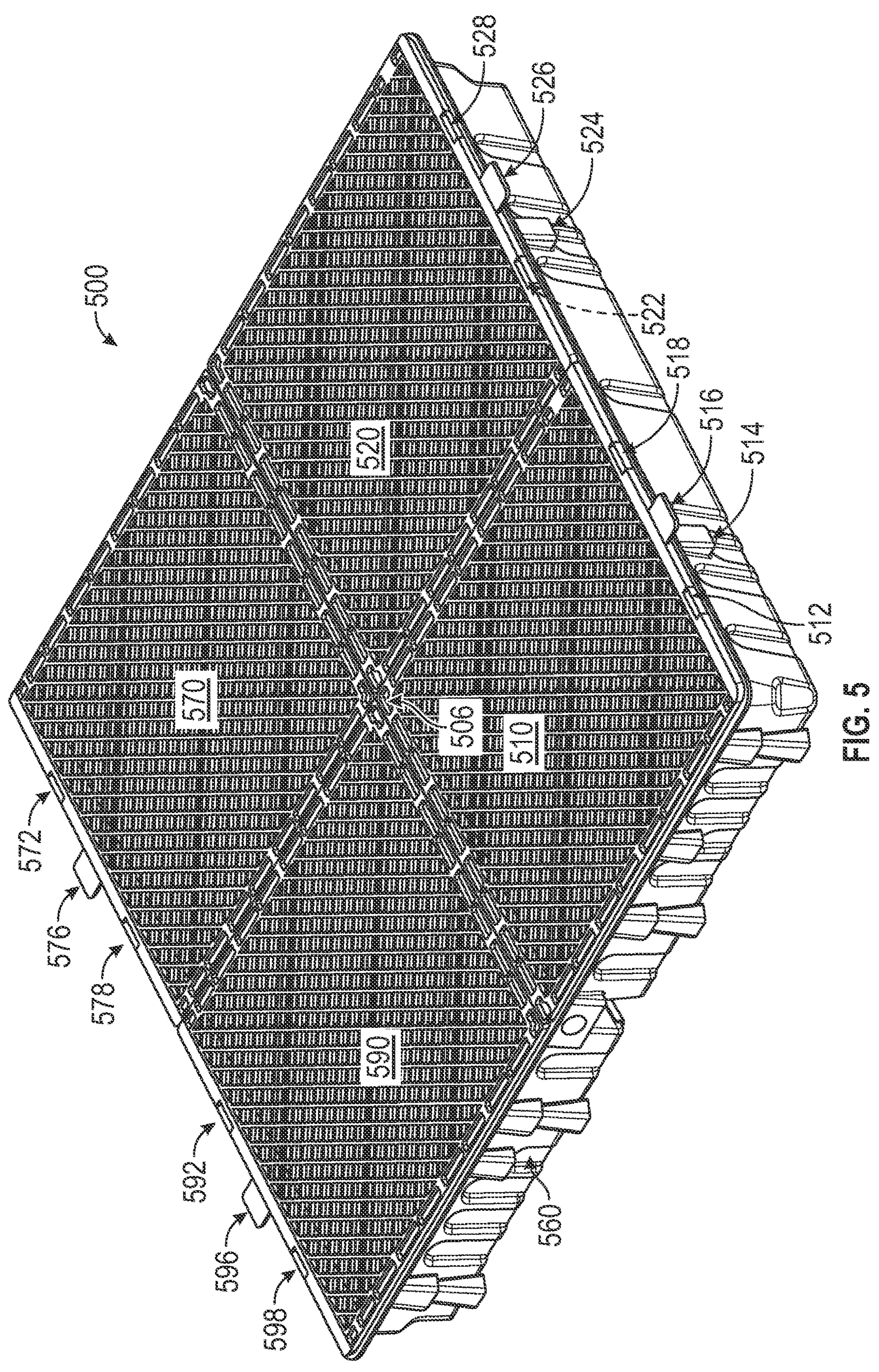
FIG. 5 is a schematic illustration of tray modules linked or joined together to form another embodiment of a tray assembly that can be positioned atop a container.
Figure 6:
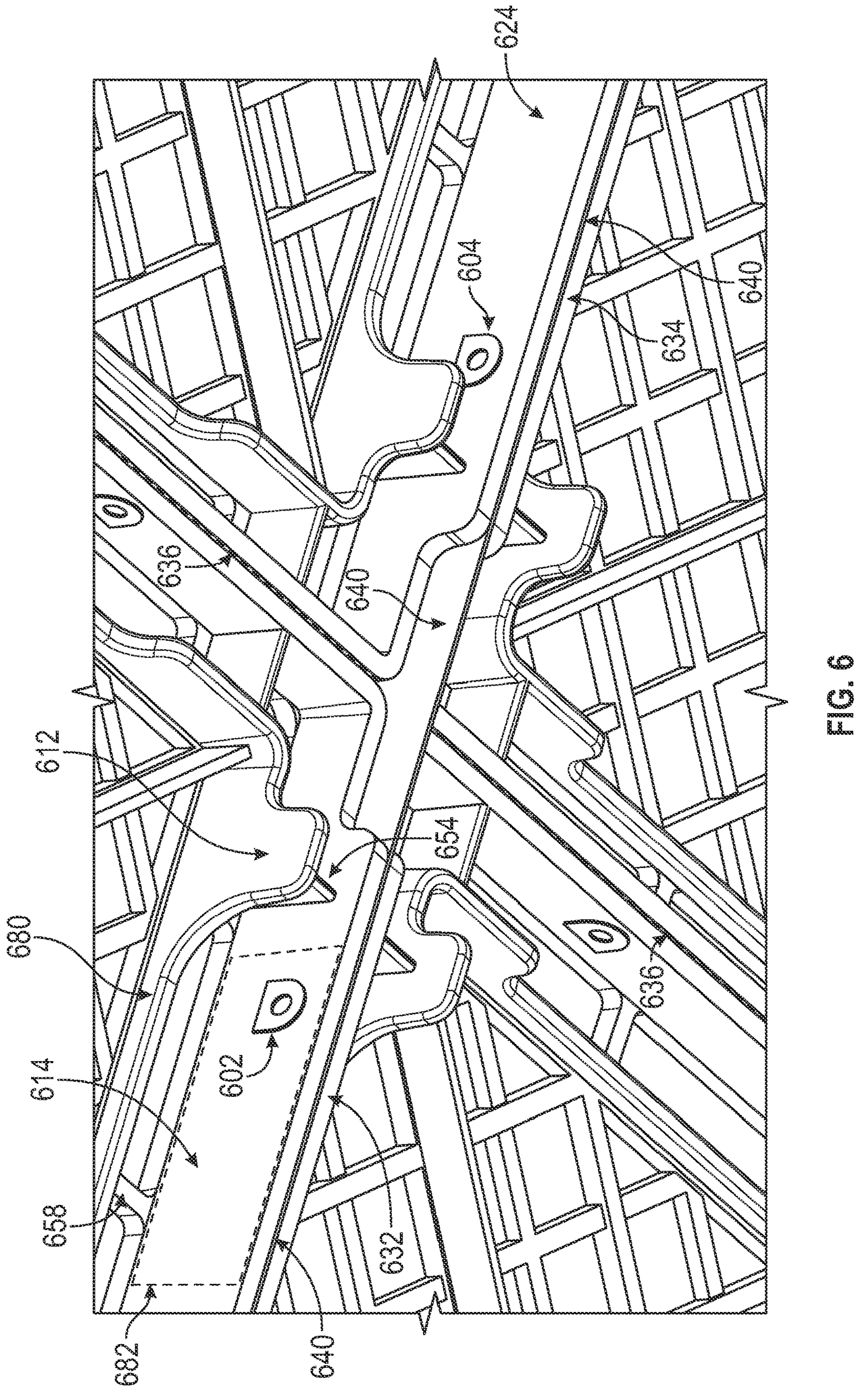
FIG. 6 is a schematic illustration of two or more tray modules linked or joined together.

Stiffening strips can be used to join adjacent tray modules such as those shown in FIGS. 5 and 6 or FIG. 9. Stiffening strips can be placed between tray sides of adjacent tray modules in a tray assembly, the stiffening strips can be placed along the outer trays sides of adjacent modules in a tray assembly, or the stiffening strips can be any combination of these. One or both of the stiffening strips 636 and 640 can be arched or prestressed and can further be partially notched to allow the strips to cross each other in the center region of a tray assembly. One or both of the stiffening strips 636 and 640 can be partially notched to allow the strips to cross each other in the center region of a tray assembly. Notching the stiffening strips can allows them to cross one another while the remaining solid portions of the strip can provide stiffness and support to the tray assembly. Stiffening strips can be composed of metals, metal alloys, ceramics, or polymer composites and can reduce creep of the polymer used for the tray modules and tray assemblies. Connecting features on tray sides can be flush with the tray side surface which allows the tray side can be placed directly next to each other or so that tray sides can be placed directly next to the stiffening strip in a sandwich configuration. In some embodiments the tray sides can have a recess for half the stiffening strip thickness and optionally a lip near the top surface of the tray modules that can allow tray sides to enclose the stiffening strip and prevent direct metal contact with the soilless growth media.

In embodiments of the disclosure a square tray assembly made from four (2.5 foot square) tray modules with stiffening strips between joined tray modules can deflect less than 0.25 inches (0.635 centimeters) at the center portion of the tray assembly when 60 pounds (27.2 kilograms) or more is uniformly distributed across the tray or assembly when the tray assembly is supported between the tray side and inner tray sides.

In some embodiments of tray module the first side and the fourth side can be the same as the second and third tray sides and the first side can include connecting features and inner tray sides with stand-offs. Optionally a separate piece can be connected to any tray side to form a covered edge (e.g. FIG. 1, 142) which can include stand-off engagement features and one or more stand-off.

Figure 4:
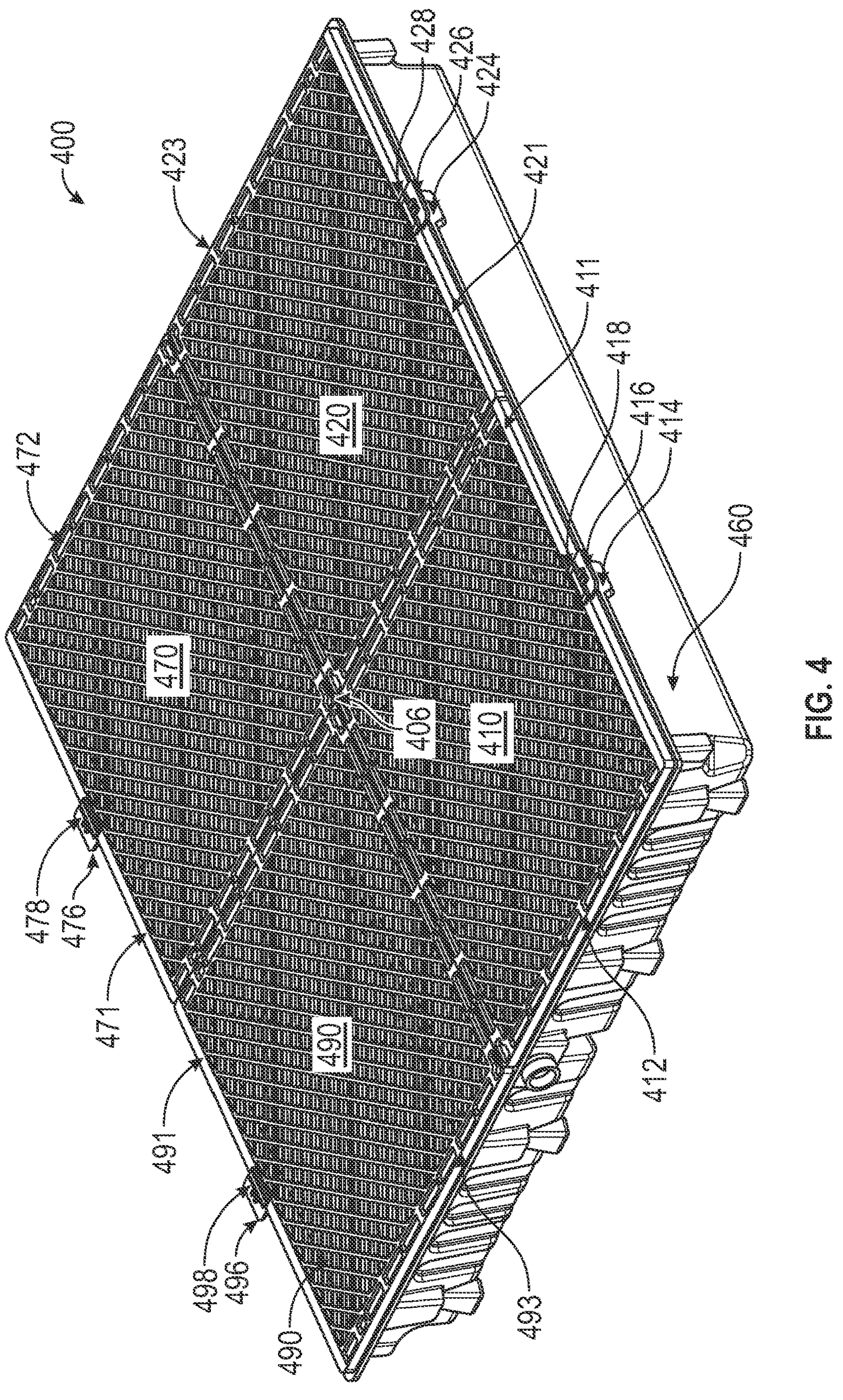
FIG. 4 is a schematic illustration of tray modules linked or joined together to form a tray assembly and the tray assembly positioned atop a container.

FIG. 1 is a schematic illustration of a vertically stacked configuration 100 of tray modules 110 and 120. Tray module 110 can have one or more tray sides such as 107, 108, etc., and tray module 120 can have one or more tray sides such as 105, 106, etc. Tray sides 105 and 107 can be referred to as first tray sides and for the tray modules 120 and 110. First tray sides can have a closed interface with the top surface as illustrated by reference number 140; second tray sides like 106 can have an interface with openings like 134 between brace, rib, or gusset portions 164. Tray module 120 can include stand-offs such as but not limited to 122, 124, and 126, and tray module 110 can include stand-offs such as but not limited to 112, 114, 116 and the like. Stand-off structures 122 and 126 are non-limiting examples of stand-offs that can be located within the tray side perimeter; stand-off structures 112 and 114 are non-limiting examples of stand-off structures that can be located within the tray side perimeter. These stand-offs structures extend away from or beyond the bottom edge of tray sides. Stand-off structures can separate the top tray module 120 from the bottom tray module 110 and can also separate a tray module like 110 from a lower supporting surface (not shown) such as a cart shelf or table. The top surface 142 of tray 110 can include a stand-off engagement structure 118 and the top surface 140 of tray 120 can include stand-off engagement structure 128. Tray 110 can include a handle such as 117 that can be located near the center of the side 107; the handle can be located at the position of the stand-off 116. In some embodiments of the disclosure tray module does not have a handle, and the stand-off engagement structure can be positioned on the closed top surface portion of the tray module. Tray 120 can include a handle such as 127 that can be located near the center of the side 105; the handle can be located at the position of the stand-off 124. Stand-off structures like 116 and 124 can also align with a pocket or groove such as 414 or 424 of a container 460 as depicted in FIG. 4. In FIG. 1, top tray module protrusion or stand-off 124 aligns with and engages stand-off engagement structure 118 on the top surface 142 of the bottom tray module 110. Tray module 120 illustrates two or more brace or rib structures like 150 and 152 that can have straight line portions that directly connect or join tray sides. The brace and rib portions can be continuous and formed for example by molding or machining stock sheets of material, or may be assembled from parts that are welded, fused, fusion bonded, or coupled together with adhesives or fasteners to form a lattice with the tray sides. The brace or rib portions 150 and 152 can span between adjacent inner tray sides (e.g. 160 and 162) and can form the openings 130 with walls of the openings 130 between the top surface 140 and the bottom surfaces of the tray module. The brace and rib portions 150 and 152 can form in part or include the top surface, e.g. 140 of the tray module. An edge portion of the tray module top surface can be closed which can be advantageous for preventing plant development along edges of tray modules and tray assemblies by reducing contact of edge plants with equipment and improving food safety. The brace or rib portions can strengthen the tray modules and tray assemblies. Openings 132 are illustrated in the top surface 140 of tray module 120 and can be positioned between the tray side 136 and inner tray side 138. Tray sides can include connecting features (from inside to outside) such as 102 and 104 that can be flush with the tray side surface and aligned with connecting features on other sides. Connecting features of the tray side can be used to link the tray side of one tray module with the tray side of another tray module to form and extended tray assembly.

FIG. 2 is a schematic illustration of underside portions of two tray modules, e.g. first tray module 210 and second tray module 220 joined together along tray sides 208 and 206 by one or more connecting features 202 to form all or part of a tray assembly. The tray sides, e.g. 208, can have a tray side bottom edge surface, e.g. 204, that is separated from the top surface 216 of the tray module by the tray side wall. The height of the tray side can be measured from the top surface 216 of the tray module to the tray side bottom edge surface 204. Tray module 210 can have braces or ribs 250, 261, 263, and 265 that can span between adjacent inner tray sides and can have a top surface that can includes a straight line portion and can form openings such as 230 and 233 between the top and bottom of the tray module. The braces or ribs can be joined or coupled to the inner tray sides.

In FIG. 2, tray openings such as but not limited to 230 and/or 233 can have walls that can have different heights as measured between one or more of the bottom surfaces (e.g. 252, 262, 264) and the top surface 216. The height of an opening wall from the top surface 216 can depend on the difference in brace or rib height or thickness as measured from the top surface 216 to a bottom surface of a brace or rib. For example, tray module 210 can have: rib 250 with bottom surface 252; rib 261 with bottom surface 262; and rib 263 with bottom surface 264. As measured from the top surface 216 to the bottom of the ribs, the height or thickness of the ribs can be: thickness of rib 261 can be equal to the thickness of rib 265; the thickness of rib 265 can be less than the height or thickness of rib 263; the height of rib 263 can be less than the height or thickness of rib 250. Ribs like 261 and 265 can have the same height and can have the smallest wall height or thickness of the openings of the tray, rib 263 can have a height or thickness that is greater than the height of the ribs 261 and 265 and is less than the height of ribs like 252, and rib 252 can have the largest height or thickness of the braces or ribs. The height or thickness of the trays sides 208 is greater than the height or thickness of the braces or ribs. The tray module openings like 230 or 233 with the walls between the top surface and any bottom surface of the opening comprise walls that have a height or thickness measured from the tray top surface to any bottom surface of the opening that is less than the height or thickness of any tray side measured from the tray top surface to the tray side bottom edge surface.

Openings with one or more braces or ribs such as 261 and 265 that have a smaller height compared to the tray sides and optionally some braces like 250 can be advantageous for tray modules because they can reduce interference or shadowing of small young seedling roots from contact with nutrient solution while thicker braces or ribs and tray sides can provide structural support and a flat top tray surface or tray assembly loaded with plants. Thinner braces or ribs can be especially advantageous for openings like 230 and 233 in a tray module when used in aeroponic systems because they can minimize shadowing/interference of nutrient spray droplets being delivered to small young plant roots while the thicker tray sides and braces provide support and a flat surface. Openings such as but not limited to opening 238 formed for example between the tray side 208, inner tray side 260, and gussets like 254 and 258 are absent braces or ribs that span between adjacent inner tray sides.

FIG. 2 also illustrates opening features such as 280 and 282 that are part of the inner tray sides 260 and 268 respectively. The openings can be opposite the one or more connecting features such as 202 of the tray side. These opening features 280 and 282 can provide a user with visual and tool access to connecting features such as 202 along the tray sides 208 and 206 respectively and can facilitate the insertion and removal of fasteners from the connecting features. The one or more opening features of the inner tray side can have an arched shape as depicted in FIG. 2. Stand-offs 212 and 226 are illustrated on each tray 210 and 220 respectively. The stand-offs can have a stand-off bottom surface 270. Other stand-off structures can be positioned inside the tray side perimeter (not shown). Stand-off 212 of the inner tray side 260 can be joined to tray side 208 by gusset 254, and stand-off portion 226 of inner tray side 268 can be joined to tray side 206 by gusset 256. The one or more stand-offs that extend beyond the bottom edge of the tray side do not block or interfere with access to the connecting features of the tray side.

FIG. 3 is a schematic illustration of one or more tray modules linked together or joined together to form a tray assembly 300. Tray modules 310, 320, 370, and 390 are shown being reversibly joined together, for example using removable fasteners, in one configuration of a tray assembly 300. Other configuration/embodiments may include but are not limited to only tray modules 310 and 320 reversibly joined together, or only tray modules 310 and 390 reversibly joined together. Tray modules 310, 320, 370, and 390 can include a first tray side 311, 321, 371, and 391 respectively; these tray modules can include a respective second tray side 312, 322, 372, and 392 which can be adjacent to the respective first tray side; each tray module can include a respective third tray side 313, 323, 373, and 393 which can be adjacent to the corresponding first tray side and opposite the corresponding second tray side, and each tray module can include a respective fourth tray side 314, 324, 374, and 394 that can be opposite their respective first tray sides. The top surface 340 of tray module 310 can have a closed portion near first side 311 and open portions along sides 312, 313, and 314 as illustrated in FIG. 3. Other tray modules in FIG. 3 can also have a close portion near the first side. In the non-limiting example of FIG. 3, the closed portion of the top surface of the assembly along tray sides 311 and 321 on one side of the tray assembly and closed portion of the top surface along tray sides 371 and 391 can inhibit plant growth in these regions. In contrast, the top surface of the tray assembly bordering other tray sides, for example 312, 374, 373, 393, and the like, can have an open top surface to support plant growth in these regions of the tray assembly. A first side of each tray module can include a stand-off, a handle, and a stand-off engagement structure. For example, first side 321 of tray module 320, can include a stand-off 316, a handle 317, and a stand-off engagement structure 318 positioned atop the handle 317. A second side 322 of tray module 320 can be joined using connecting features to a third side 313 of adjacent tray module 310. A third side 323 of tray module 320 can optionally be left open or unconnected to another tray module. A fourth side 324 of tray module 320 can be joined to a fourth side 374 of tray module 370. The remaining tray modules 310, 370, and 390 and their respective tray sides can be similarly joined together to complete the assembly 300 depicted in FIG. 3.

The tray assembly in FIG. 3 can have a stiffening member positioned between one or more tray modules and the stiffening member can be secured between adjacent tray sides. For example, a first stiffening member can be secured along a first tray assembly axis between tray sides 322 and 313 and tray sides 373 and 392. A second stiffening member can be secured along a second tray assembly axis between tray sides 314 and 394 and tray sides 324 and 374. The stiffening members can have connecting features that align with the connecting features of the tray modules and can be held in place for example by using reversible fasteners. In some embodiments the fasteners can include nuts and bolts. Two or more tray assemblies 300 can be stacked one atop the other with one or more of the protrusion(s) or stand-offs of one tray assembly aligning with one or more stand-off engagement structure(s) of a lower tray. A grow tray assembly can include a soilless grow media atop a tray assembly. Grow tray assemblies that includes soilless grow media can be wet with water and can have seeds distributed thereon. These grow tray assemblies can be stacked one on top of another utilizing the stand-offs and stand-off engagement features from different trays to germinate the seeds on the soilless growth media. Once the seeds have germinated, the grow tray assemblies can be unstacked and positioned on individual containers for placement in a grow tower to develop the plants. A grow tray module can include a soilless grow media atop a tray module.

FIG. 4 is a schematic illustration of tray modules linked or joined together to form a tray assembly 400 that can be positioned atop a container 460. The tray assembly 400 can include tray modules 410, 420, 470, and 490 joined together along the tray sides that contact each other and can optionally include stiffening strips between the joined tray modules. The tray modules 410, 420, 470, and 490 can include respective handles 416, 426, 476, and 496, and respective stand-off engagement structures 418, 428, 478, and 498. Container 460 can include one or more notches, pockets, or grooves illustrated by 414 and 424. These pockets, notches, or grooves in the wall of the container can accept or engage a stand-offs (not shown) positioned below corresponding handles 416 and 426. In the non-limiting embodiment shown, tray sides 411 and 421 can be adjacent a top surface of the tray module that can be closed or solid along a top edge surface, and tray sides 471 and 491 can be adjacent to a top surface of the tray module that can be closed or solid along a top edge surface. The top surface between the first tray side and the first inner tray side can be closed. Top surfaces of tray module adjacent to tray sides 423 and 472 can have openings between the top and bottom surfaces, and top surfaces adjacent to tray sides 412 and 493 can have openings between the respective tray module top and bottom surfaces. Closed or solid regions of a tray assembly can be used to limit seed germination and plant development on regions or predetermined sides of a tray or tray assembly and can be advantageous in limiting plant contact with equipment and improving food safety in a grow tower. Openings or open regions near other tray sides of a tray module or tray assembly can allow plant growth near these predetermined sides or edges of trays and tray assemblies where contact with equipment is not expected. The center region 406 of the tray assembly 400 has openings between the top and bottom surfaces of the tray assembly. In some embodiments of the tray modules of the disclosure the inner tray side stand-offs can all extend the same distance beyond the bottom edge of the tray side. Tray modules with this balanced configuration of stand-off having the same height facilitates tray module exchange in tray assemblies and can be important for stacking tray modules or tray assemblies on top of each other in a balanced manner and can maintain the stability of the stack. In some embodiments of the tray modules and tray module assemblies, the stand-offs can be positioned at the center of the inner tray sides and can be positioned at the corners of the inner tray sides. In embodiments of disclosure the depth of the container can be greater than the height of the inner tray side stand-offs within the tray side perimeter. The tray assembly can be supported by the container at the tray side bottom edge surfaces of the tray assembly. The depth of the container can be greater than the distance between the tray side bottom edge surfaces of the tray assembly that are supported by the container and the stand-off bottom surface edges. The center region 406 is absent any support or contact with the bottom of the container 460. The openings in the center region and absence of support structures is advantageous because plant and root access to nutrient solution or nutrient spray is not blocked by support structures.

FIG. 5 is a schematic illustration of another embodiment of tray modules linked or joined together to form a tray assembly 500. The tray assembly 500 can be positioned atop a container 560. The tray assembly 500 has a different configuration and number of stand-off engagement structures (two per tray module (e.g. 514 and 518) that are positioned on either side of each tray module handle) compared to the stand-off engagement structure configuration of tray assembly 400 (one per tray module (e.g. 428) that is positioned near the handle of each tray module) that is depicted in FIG. 4. In some embodiments of the disclosure, the tray assembly can be absent handles on one or more of the tray modules. The tray assembly 500 can include tray modules 510, 520, 570, and 590 joined together along the tray sides that contact each other. The tray modules 510, 520, 570, and 590 can include respective handles 516, 526, 576, and 596, and respective pairs of stand-off engagement structures 512 and 518, 522 and 528, 572 and 578, and 592 and 598 for each tray module. Container 560 can include one or more notches, pockets, or grooves illustrated by 514 and 524. These pockets, notches, or grooves in the wall of the container can accept or engage tray one or more assembly/tray module stand-offs (not shown) from each tray module comprising the tray assembly 500. In the non-limiting embodiment shown, some tray sides can be closed or solid along a top edge surface (e.g. the tray sides with stand-off engagement structures), while other tray sides can have openings between the top and bottom surfaces. The center region 506 of the tray assembly 500 has openings between the top and bottom surfaces of the tray assembly, and the center region of the tray assembly is absent any support contact with a bottom surface (not shown) of the container 560.

FIG. 6 is a schematic illustration of the underside of the center region of a tray assembly where four tray modules can be linked together or can be joined together. Stiffening strips, for example 636 and 640, can be placed between tray modules to reduce creep of tray materials and help maintain the flatness of tray assemblies. The stiffening strips can be straight and include parallel top and bottom edges or the strips can have an arched or pre-stressed shape. An arched or pre-stressed shape for a stiffening strip can further reduce deflection at the center of an assembly of tray modules. For example the stiffening strip can be formed with a small arch across the length of the strip with the high point of the arch in the center region of a tray assembly near the top surface (tray assembly top surface is facing upward as in FIG. 4) where trays are joined and can have lower points of the arch at the tray sides near the edges of the tray assembly that rest in the container lip (e.g. 830). The stiffening strips can have openings for fasteners to be inserted therethrough. Tray sides from two different trays can be joined together with a stiffening strip between them. The tray side connecting features can be aligned with each other and with openings in the stiffening strip. The tray sides and stiffening strip can be coupled together with one or more fasteners. Where stiffening strip cross one another, for example as shown in FIG. 6, one or both of the stiffening strips can include a notch to allow the strips to cross each other while providing support and stiffness with the remaining material. Tray sides such as 614 and 624 (different tray modules) can be positioned against a stiffening strip 640 and joined with tray sides 632 and 634 (different tray modules) respectively from adjoining trays. Connecting features such as 602 and 604 in tray sides 614 and 624 respectively can be aligned with corresponding connecting features in the stiffening strip 640 and the tray sides 632 and 640 of the adjacent trays (not shown). Fasteners can be used to reversibly or permanently join the tray sides and stiffening strip together. Reversibly joining tray modules together along respective tray sides can be advantageous because if a portion of a tray assembly becomes damaged, the damaged module(s) can be removed and replaced with replacement section(s) of tray module. Advantageously, only a single tray module needs to be stocked to replace any section of a tray assembly which can reduce mold costs and allows keeping a smaller replacement inventory of tray modules. Open areas formed by bracing or ribbing 680 can provide access to the fasteners and connecting features 602 located on the tray side 614. A projection of the access provide to the fasteners and connecting features by the bracing or ribbing 680 from an inner tray side can be illustrated by the approximate projected opening 682 (dashed region on tray side 614). Tray side 614 can be braced and supported by gussets such as 654 and 658 which can be joined to inner tray side portions including stand-offs 612.

FIG. 7 is an image illustrating features of the underside of a tray module 700. Tray module 700 can have tray sides 711, 712, 713, and 714 that together have a perimeter. The tray module can include an optional handle 717 joined to one of the tray sides and can be used to help lift a tray module or tray assembly from a container. The tray sides have a bottom surface opposite the top surface of the tray. Stand-offs can be positioned opposite the top surface of the tray and can have a stand-off bottom surface that is further from the top surface than the tray side bottom surfaces. The stand-offs can be used for stacking two or more tray modules one atop the other and/or engaging with features of a container that position the tray module or tray assemblies made from them within the container. Stand-offs can include those in a center position on a tray side such as 770, 772, 774, and 776. Other stand-offs can include but are not limited to those such as 780 along a side 711 and stand-off 784 near a corner 783 of the tray module and side 714. Stand-offs can be joined by gussets such as 740, 742, 744, and 746 to the respective tray sides 711, 713, 714, and 712. Stand-offs can be joined to bracing between adjacent sides. For example stand-off 772 can be joined to bracing elements 750 and 752 on one side of stand-off 772 and joined to gusset 742 and tray side 713 on the other side of stand-off 772. Stand-off 774 can be joined to bracing elements 752 and 754 on one side of the stand of 774 and joined to gusset 744 and tray side 714 on the other side of stand-off 774. Stand-off 776 can be joined to bracing elements 754 and 756 on one side of stand-off 776 and joined to gusset 746 and tray side 712 on the other side of stand-off 776. Stand-off 770 can be joined to bracing elements 756 and 750 on one side of stand-off 770 and joined to gusset 740 and tray side 711 on the other side of stand-off 770. Stand-offs such as 784 located near the corners can be joined to diagonal braces 762 or 764 and gussets. Smaller bracing elements like 766 can join adjacent tray sides.

Figure 8:
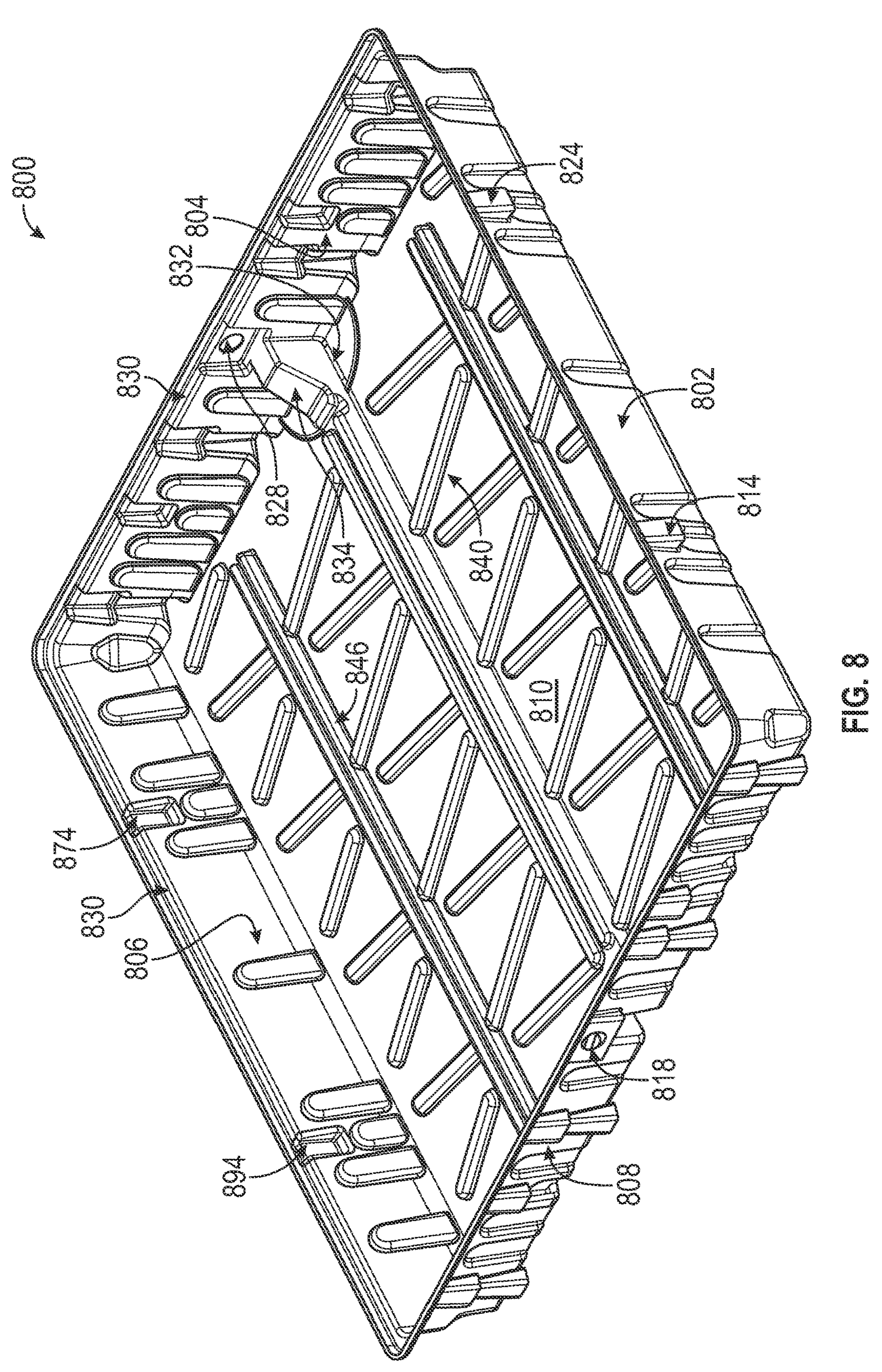
FIG. 8 is a schematic illustration of a container that can support tray modules and tray assemblies.

FIG. 8 is a schematic illustration of a container 800 that can be used with the tray modules and tray assemblies in embodiments of the disclosure. Container 800 can retain liquids. Container 800 can have side walls 802, 804, 806 and 808 that can be joined together at their side edges. The bottom edges of the side walls can be joined to the bottom 810 along its outer edges to form the container 800. A top edge of the joined side walls can have a lip 830. The lip 830 can support a side edge of a tray module or a tray assembly (not shown). The container 800 can have openings 818 and 828 through walls of the container for fluid inlet and outlet conduits (not shown). A drainage port 832 can be formed along one or more openings at the base of the support structure 834. In some embodiments of the disclosure, the bottom of the opening 832 can be positioned at or below the main surface 810 of the container. Support structure 834 have a ramp structure that can be joined to the container wall 804 and container bottom 810 to supports wall 810 from pressure exerted by fluid delivery lines. The support structure 834 can support fluid delivery conduits (not shown). Raised drainage structures 840 above the bottom surface 810 and nutrient delivery manifold support structures 846 can be positioned along the container bottom surface 810. Containers 800 can nest inside of each other. When the tray is tilted with sidewall 808 being higher than sidewall 804, liquid in the bottom 810 of the container will flow and drain into drainage port 832. Container sidewalls can include notches or recesses such as 814, 824, 874, and 894 that can accept stand-offs from tray modules or tray assemblies.

FIG. 9 is an illustration of a tray assembly 900 comprising two tray modules 910 and 920 that can each have a triangular geometry (that can each be made from the same mold) and that can be joined together by connecting features along tray sides 913 and 923 that are in contact with each other to form the tray assembly 900. Continuous top surface portions/brace/ribs such as 940 can span between adjacent tray sides 921 and 922 and form the openings with walls between the top surface 944 and the bottom surfaces of tray 920. Continuous top surface portions/brace/ribs such as 942 can span between adjacent tray sides 911 and 912 and form the openings with walls between the top surface 946 and the bottom surfaces of tray 910. Tray 910 and 920 can have one or more stand-off engagement structures. Note that only stand-off engagement structure 930 is marked in FIG. 9 for clarity on tray module 920, but other stand-off engagement structures are shown above corresponding stand-off 928 and 932 and/or on handles 914, 916, 924, and 926. The opening of the one or more stand-off engagement structures for tray modules such as 910 and 920 can be aligned with the bottom edge surface of one or more stand-offs (e.g. 930 is aligned with 928). The stand-off engagement structure has an opening that accepts and retains the bottom surface of a stand-off from another tray positioned atop the tray module. Tray 910 can have handles 914 and 916, stand-offs (not shown), and stand-off engagement structures. Stand-off structures like 928 and 932 can also align with pockets or grooves such as 416 and 424 in a container 460 as depicted in FIG. 4. In some embodiments, tray module 910 can have first, second and third tray sides 911, 912, and 913 respectively and corresponding first, second and third inner tray sides (not shown in FIG. 9). The top surface between the first tray side and the first inner tray side along sides 911 and 921 can be closed to limit plant growth along container edges.

Figure 10:
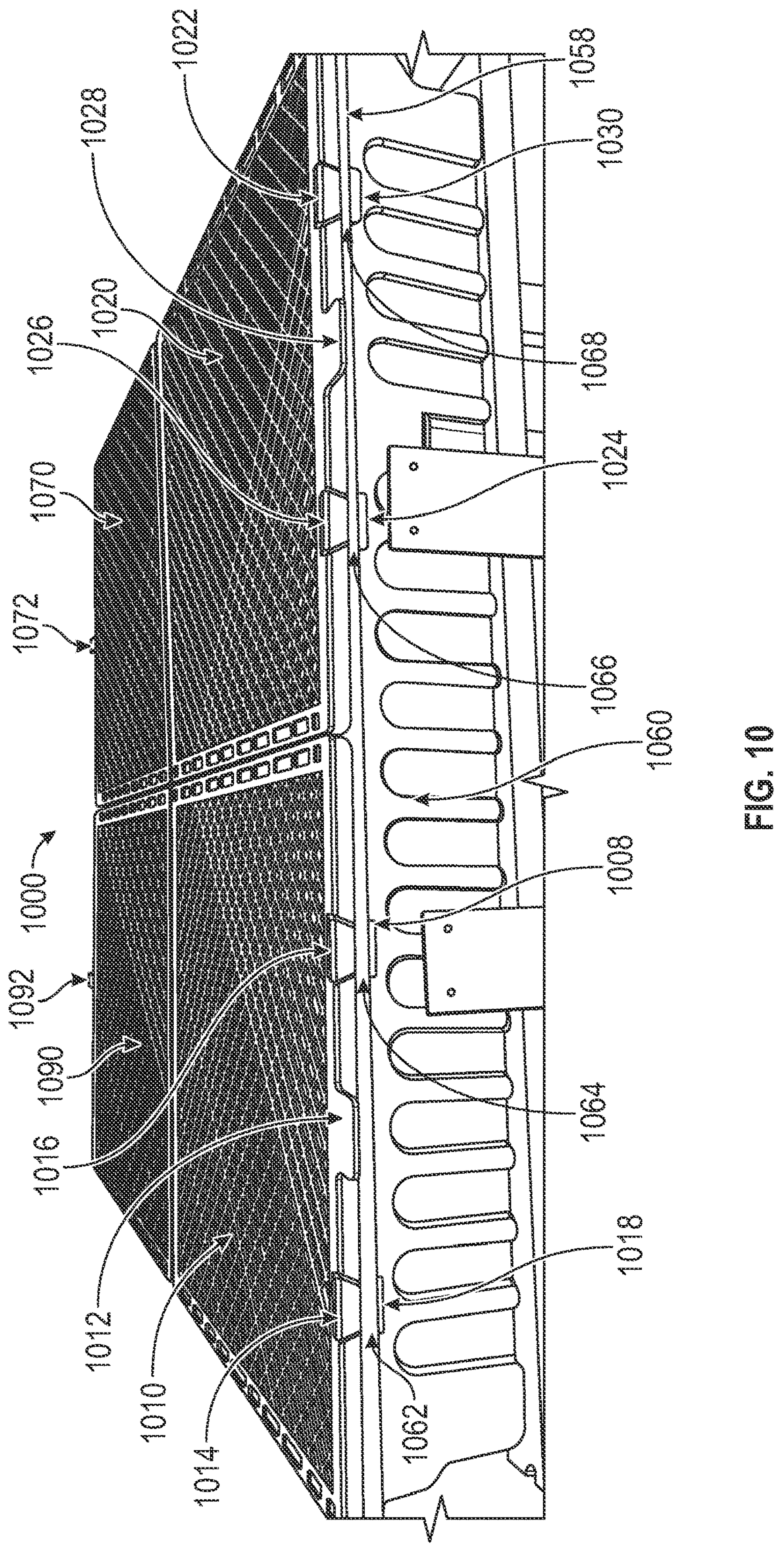
FIG. 10 illustrate features of an embodiment of a tray assembly position with a container.

FIG. 10 illustrates features of another embodiment of a prototype tray assembly 1000 that includes four tray modules 1010, 1020, 1070, and 1090 joined along tray sides and positioned atop a rim 1058 of container 1060. The container rim 1058 can include one or more notches or slits through the rim 1058 from a top surface to a bottom surface such as 1062, 1064, 1066 and 1068 that can accommodate stand-offs 1018, 1008, 1024, and 1030 respectively in the rim slits from the tray assembly 1000. Opposing sides of the tray assembly can include handles or other structure for lifting and removing tray assemblies from the container. Examples of handles on one side of the tray assembly include 1012 and 1028; handles 1092 and 1072 are on the opposite side of the tray assembly. The top surface of the tray assembly can include stand-off engagement structures on opposing sides of the tray assembly. The top surface of the tray handle can be aligned or flush with the top surface of the tray assembly as illustrated in FIG. 10. Stand-off engagement structures on one side of the tray assembly in FIG. 10 can include 1014, 1016, 1026, and 1022. Stand-off engagement structures can include a raised lip that can be on the top surface of the tray assembly. The raised lip can position the bottom surface of a stand-off on the top surface. The stand-off engagement structures can be on opposite sides of the tray assembly (not shown). These stand-off engagement structures can align with stand-offs from another tray assembly and two or more tray assemblies can be stacked for germinating seeds.

Figure 11:
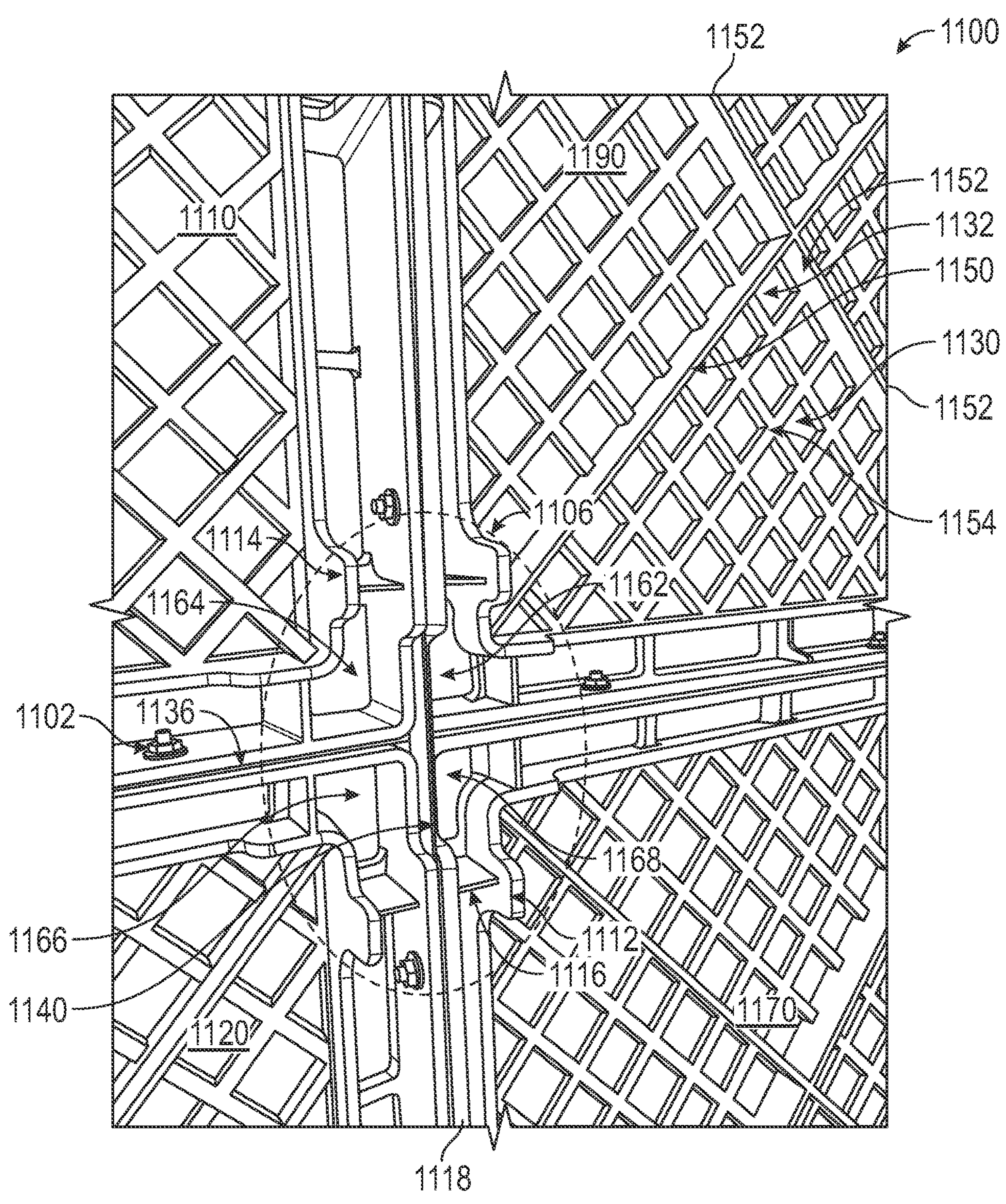
FIG. 11 illustrate features of a tray assembly near the center underside region of the tray assembly in FIG. 10.

FIG. 11 illustrates a view of the bottom features in a center region of an embodiment of a tray assembly 1100. Trays 1110, 1120, 1170, and 1190 can be joined together to form tray assembly 1100. In a non-limiting example, a fastener 1102 is shown joining the tray wall of tray 1110, a stiffening strip 1136, and the tray wall of tray 1120 together. Other tray walls and stiffening strips 1136 and 1140 in the tray assembly 1100 can be similarly joined together. The bottom center region 1106 (see area enclosed by dashed line in FIG. 11) of the tray assembly can include stand-offs and openings from each grow tray module (e.g. 1110, etc.) for plant roots to contact nutrient solution from below. Non-limiting examples of stand-offs on the underside of the tray assembly that can be used to separate stacked tray assemblies for seed germination or to align tray assemblies with a lower container can include 1112 and 1114. The stand-offs like 1112 can be joined to a gusset 1116 that can be joined to the tray side 1118. The center region of the assembly 1100 can be unsupported from below (no contact with a container bottom) when the tray assembly is used (e.g. positioned as in FIG. 4) with a container. The container can have a depth from the bottom of the container lip to the container bottom that is greater than the distance between the tray assembly top surface and stand-off bottom surfaces of the tray assembly. Examples of openings in the center region 1106 of the tray assembly 1100 include opening 1164 in tray 1110; opening 1162 in tray 1190; opening 1168 in tray 1170; and opening 1166 in tray 1120. Openings such as these in the center region of the tray assembly allow plant roots access to nutrient solution from below the top surface of the tray assembly. Other openings between the top and bottom surfaces of the tray assembly can include 1130 formed by thinner rib portions 1154 of the tray, and an opening 1132 formed by a combination of thicker rib portions 1150 and 1152 and thinner rib portions like 1154 of the tray. Thinner tray module openings, e.g. less distance between the top surface and bottom surfaces, in tray modules or tray assemblies can permit greater nutrient solution access to plant roots positioned below the tray assembly top surface and the growth media. Openings with smaller wall thickness (e.g. 1130) between the top surface and the bottom surface on all sides of the opening can be beneficial in providing less obstructed access to nutrient solution for young seedling roots.

Stiffening strips, for example 636 and 640 in FIG. 6 or 1136 and 1140 in FIG. 11, can be placed between tray modules. The strips can be straight with parallel top and bottom edges. In some embodiments the stiffening strip can be formed with a small arch across the length of the strip with the high point of the arch in the center region of a tray assemble where trays are joined and lower points of the arch at the tray sides of the tray assembly. The stiffening strips can have openings for fasteners to be inserted therethrough. Tray sides from two different trays can be joined together with a stiffening strip between them. The tray side connecting features can be aligned with each other and with the openings in the stiffening strip. The tray sides and stiffening strip can be coupled together with one or more fasteners. Where stiffening strip cross one another, one or both of the stiffening strips can be partially notched. Notching the stiffening strips allows them to cross one another while the remaining solid portions of the strip can provide stiffness and support to a tray assembly. For example stiffening strips 1136 and 1140 can intersect or cross one another as illustrated in FIG. 11. Each of the stiffening strips 1136 and 1140 can be partially notched to allow the strips to cross each other. In embodiments where only two trays are joined together, the stiffening strip(s) can be joined using fasteners to one or more of the outside surfaces of the grow assembly that may span sides of a container or be unsupported. The stiffening strips can be composed of metals, alloys, ceramics, or composites including polymers and can reduce creep of the polymer used for the tray modules and tray assembly. In embodiments of the disclosure, the stiffening strip can be retained with fasteners. In other embodiments the stiffening strip can be retained with a combination of fasteners and washers and/or clasps. The clasp can for example have a "U" shape or a squared "U" shape such as "ц". The closed bottom end of the clasp can capture the bottom edges of both tray sides along with the stiffening strip. The clasp can have openings that align with the connecting features.

FIG. 12 A-C illustrate different configurations of the top surfaces of tray modules in embodiments of the disclosure. The tray modules can have stand-offs below the top surfaces (not shown) and the tray sides can be connected to the top surfaces. The tray modules are shown without handles. The tray sides 1211, 1212, 1213, and 1214 can have connecting features, for example through holes, for fasteners passing through tray sides (not shown). The top surfaces can have stand-off engagement structures (not shown). The top surface of the tray side nearest 1211, and in some views the top surface between tray side 1211 and inner tray side 1201 can be closed or solid to prevent plant development along the top side of the tray module and tray assemblies made from them. FIG. 12A illustrates structures like 1252 comprising the top surface of a tray module that can have straight line portions that can be joined to adjacent tray sides such as 1211 and 1212; structures like 1250 comprising the top surface of a tray module can have straight line portions that can be joined to opposite corners such as 1216 and 1246. Other (unmarked for clarity) structures like 1250 and 1252 in FIG. 12A can be joined to trays sides 1211, 1212, 1213, and 1214, corners, or any combination of these. In FIG. 12A, 1217 illustrates a region along tray side 1212 where two structures like 1254 and 1256 that can include the top surface of the tray module can be joined together at the tray side 1212. Joining structures like 1254 and 1256 at a common region 1217 along a tray side can improve the structure and stiffness of a tray module. Joining structures like 1254 and 1256 by fusion such as by molding or welding at a common region 1217 along a tray side can further improve the structure and stiffness of a tray module. Tray modules illustrated in FIG. 12 B and FIG. 12 C can have the tray sides 1211, 1212, 1213, and 1214 and in addition can have inner trays sides 1201, 1202, 1203, 1204. The inner tray sides in FIG. 12B and FIG. 12C can have corners such as 1206 and 1236 spanned by a structure like 1250 that can include the top surface (other corners can be similarly spanned, not marked for clarity). FIG. 12 B illustrates that the structures comprising the top surface of a tray module such as 1254 can join adjacent tray sides like 1211 and 1212 and join adjacent inner tray sides like 1201 and 1202 by the straight line portion of structures like 1254. Structures comprising the top surface of a tray module such as 1254 and 1258 can join to the inner tray side 1201 at region 1215 of inner tray side 1201. FIG. 12 C illustrates that the structures comprising the top surface of a tray module such as 1252 can join adjacent inner tray sides like 1201 and 1202 by the straight line portion of 1252 without joining corresponding tray sides 1211 or 1212. In FIG. 12B the structure 1252, which can be a brace or rib, can join adjacent tray sides like 1211 and 1212 and inner tray sides like 1201 and 1202 by the straight line portion 1252. FIG. 12 C illustrates that the straight line portion of 1252 can be configured to join only inner tray sides 1201 and 1202 by the straight line portion 1252. FIG. 12C further illustrates that inner tray side 1201 can be joined to tray side 1211 by gusset or rib 1257 and that inner tray side 1202 can be joined to tray side 1212 by gusset or rib 1259. Region 1219 in FIG. 12 C illustrates a region along an inner tray side 1201 where two structures like 1252 and 1258, that can include the top surface of the tray module, can be joined to the tray side 1201 and where a gusset such as 1257 can be joined to the inner tray side 1201 and tray side 1211 at region 1219. This structure can advantageously provide stiffness to the tray module and tray sides while providing access through openings in the inner tray side, e.g. 1201 (not shown, but see 680 and 682 in FIG. 6), to connecting features in the tray side 1211. FIG. 12C illustrates that gusset or rib 1257 (and similarly for 1259) is not a straight line portion or extension of structure 1252 or other top surface portion. FIG. 12B further shows that structure 1250 which can include a top surface of the tray module can join opposing corners such as 1206 and 1236 formed by the inner tray sides like 1201 and

1202 and inner tray sides like 1203 and 1204 and can join opposing corners such as 1216 and 1246 formed by tray sides 1211 and 1212 and trays sides 1213 and 1214. Openings such as 1230 can be formed by the two or more structures comprising the top surface of the tray modules as illustrated in FIGS. 12 A-C.

Tray modules can have any shape that allows tiling of the tray modules to form a tray assembly. The tray modules can have a geometric shape. The tray modules can also be half of a geometric shape to allow tiling and formation of tray assemblies with straight edges. Geometric shapes can include parallelograms like rectangular tray modules as in FIG. 1, triangular tray modules as in FIG. 9, hexagonal tray modules, or combinations of these. The tray modules can have a top surface with openings between the top and bottom surfaces. The tray modules can further have tray sides, inner tray sides with openings to access connecting features of the tray sides, structures including the top surface of a tray module that can have straight line portions that can be joined to adjacent tray sides or corners between adjacent tray sides, stand-off structures opposite the top surface of the tray module, and one or more stand-off engagement structures on the top surface of the tray module. The ends of the tray sides can be joined together to form the geometric shape of the tray module. The ends of the inner tray sides can likewise be joined together form the geometric shape of the tray module. For example, a first end of a first tray side can be joined to a first end of the second tray side. A second end of the second tray side can be joined to a first end of the third tray side. A second end of the third tray side can be joined to a first end of the fourth tray side. The second end of the fourth tray side can be joined to the second end of the first tray side to complete the parallelogram. The stand-off engagement structures can be aligned with the bottom edge surface of one or more stand-offs. The stand-off engagement structure can include an opening or a lip atop the top tray surface that accepts and retains the bottom surface of a stand-off from another tray positioned atop the tray module. The bottom surface of the stand-offs can be the same distance from the top surface. Stand-off structures can be positioned within the tray side perimeter. Stand-offs forming part of the inner tray side can be joined to tray sides by gussets. The one or more inner tray side stand-offs can extend a distance beyond the bottom edge of the tray side and these stand-offs do not block or interfere with access to the connecting features of the tray side. In some embodiments of the tray modules the inner tray side stand-offs can all extend the same distance beyond the bottom edge of the tray side. Tray modules with this balanced configuration of stand-off having the same height facilitates tray module exchange in tray assemblies and can be important for stacking tray modules or tray assemblies on top of each other in a balanced manner and can maintain the stability of the stack. In some embodiments of the tray modules and tray module assemblies, the stand-offs can be positioned at the center of the inner tray sides and can be positioned at the corners of the inner tray sides. In embodiments of disclosure the depth of the container can be greater than the height of the inner tray side stand-offs within the tray side perimeter. The tray assembly can be supported by the container at the tray side bottom edge surfaces of the tray assembly. The depth of the container can be greater than the distance between the tray side bottom edge surfaces of the tray assembly that are supported by the container and the stand-off bottom surface edges.

The tray sides can have a tray side bottom edge surface that is separated from the top surface of the tray module by the tray side wall. The height of the tray side can be measured from the top surface of the tray module to the tray side bottom edge surface. Tray modules can have braces or ribs that can span between adjacent inner tray sides and can have a top surface that can includes a straight line portion that can form the openings between the top surface and bottom surface of the tray module.

Tray openings can have walls that can have the same or different heights as measured between one or more of the bottom surfaces of the ribs and the top surface. The height of an opening wall from the top surface can depend on the difference in brace or rib height or thickness as measured from the top surface to a bottom surface of a brace or rib. The height or thickness of the trays sides is greater than the height or thickness of the braces or ribs. The tray module openings with the walls between the top surface and any bottom surface of the opening comprise walls that have a height or thickness measured from the tray top surface to any bottom surface of the opening that is less than the height or thickness of any tray side measured from the tray top surface to the tray side bottom edge surface.

Openings formed from the one or more braces or ribs that have a smaller height compared to the tray sides and optionally that have a height smaller than some braces or ribs can be advantageous for tray modules because they can reduce interference or shadowing of small young seedling roots from contact with nutrient solution while thicker braces or ribs and tray sides can provide structural support and a flat top tray surface or tray assembly loaded with plants. Thinner braces or ribs can be especially advantageous for openings in tray modules and tray assemblies when used in aeroponic systems because they can minimize shadowing/interference of nutrient spray droplets being delivered to small young plant roots while the thicker tray sides and braces provide support and a flat surface The tray modules can optionally have one or more top surface portions that are closed (similar to closed top surface portions of 140 and 142 in FIG. 1) to restrict plant development along an edge or other portion(s) of the tray module. The tray modules comprising the tray assembly can be made from a single mold by injection molding using a polymer or polymer composite that has good creep resistance. ABS (acrylonitrile-butadiene-styrene), polyethylene or other creep resistant injection moldable plastic materials can be used in compositions that can be injection molded to form tray molds. Alternatively, the tray modules can be machined from similar stock materials having good creep resistance or prepared by 3-D printing materials with good creep resistance. The tray modules including the top surface portions, tray sides, inner tray sides and stand-offs, brace and rib structures including the top surface that have a straight line portion that can span between adjacent tray sides and form the openings with walls between the top surface and the bottom surface can be continuous and formed for example by molding, machining stock sheets of material, or can be assembled from parts that are welded, fused, or fusion bonded together. Alternatively, portions of the tray modules can be coupled using adhesives or fasteners. Tray modules that are continuous and formed by molding, machining stock sheets of material, or have parts that are welded, fused, or fusion bonded together can maintain improved stiffness compared to parts that are coupled using adhesives or fasteners.

Figure 13B:
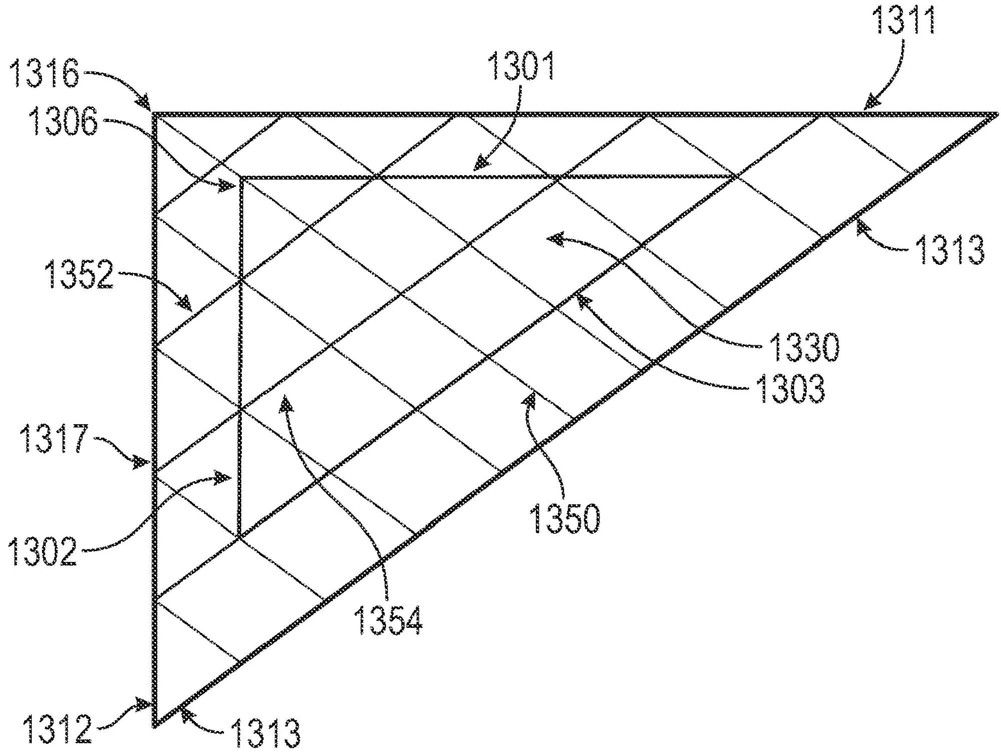
Figure 13C:
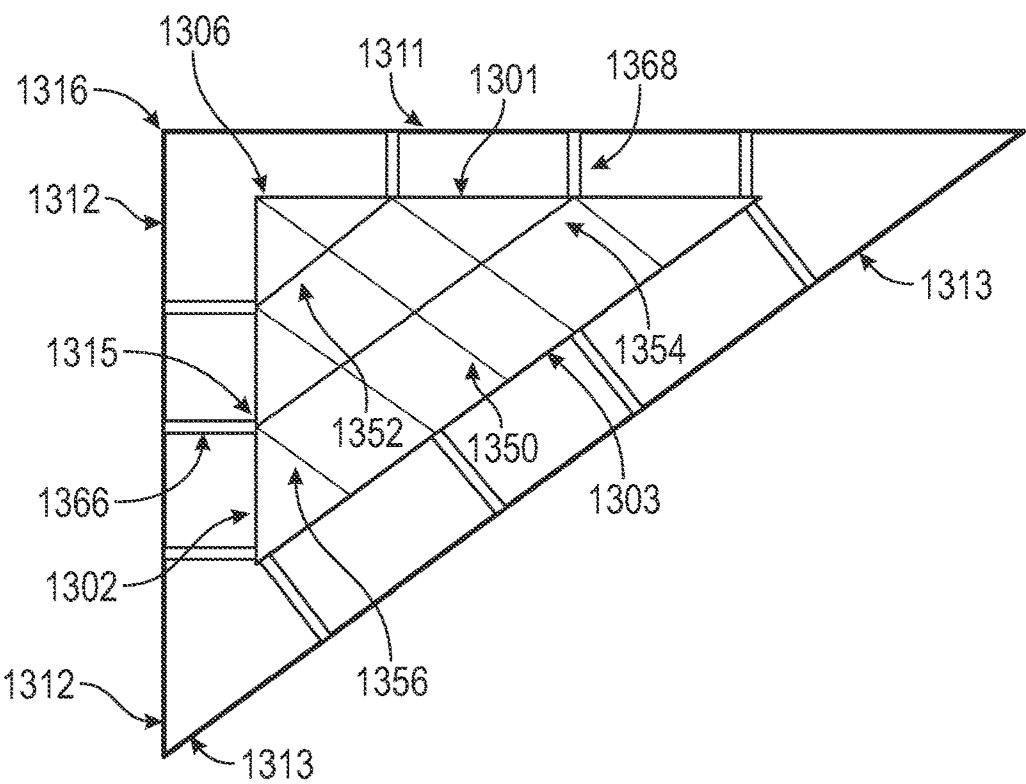
Figure 13D:
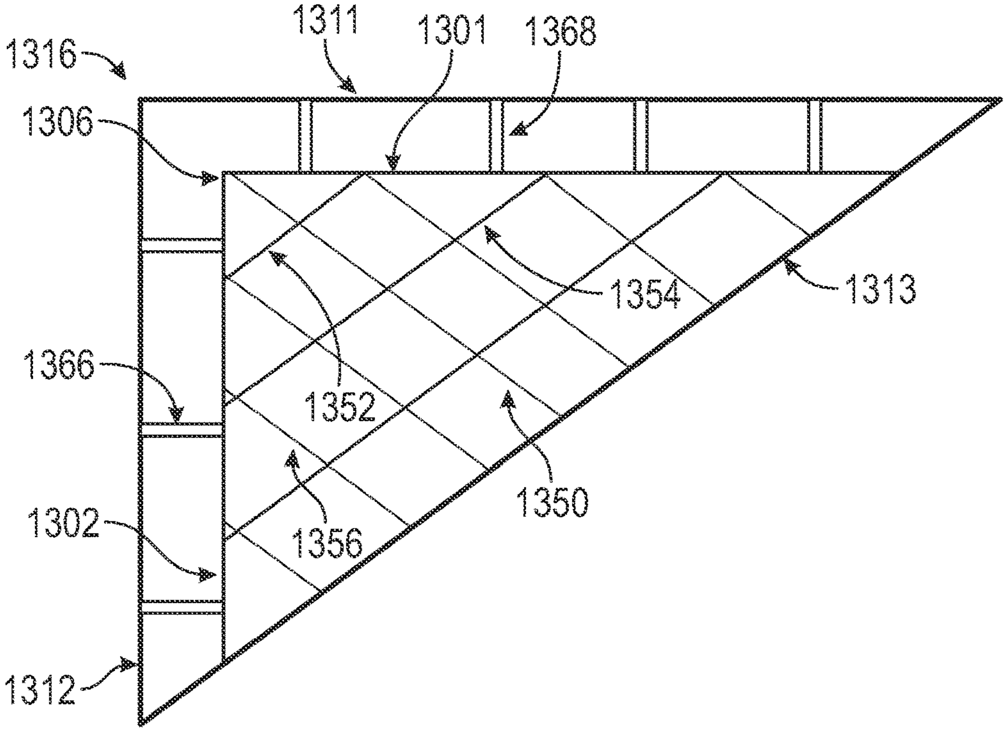

FIG. 13A-D illustrates a tray module that has a triangular geometric shape and that can be tiled and joined together to form tray assemblies (see also FIG. 9). Configurations of triangular shaped tray modules having two or more structures comprising the top surface can include straight line portions joined to various tray sides, joined to a corner between various tray sides and an opposite tray side, or a combinations of these as illustrated in FIG. 13A-D. The tray modules can have stand-offs below the top surfaces (not shown), tray sides having a perimeter, and a top surface. The tray sides 1311, 1312, and 1313 can have connecting features, for example through holes, for fasteners passing through tray sides (not shown) to couple tray sides from adjacent tray modules and to optionally couple a stiffening strip between the adjacent tray modules. Inner tray sides such as but not limited to 1301, 1302, and 1303 can have openings the provide access to the connecting features of the corresponding tray sides 1311, 1312, and 1313. Openings in the inner tray sides opposite the connecting features can be advantageous in providing space for tool access to the connecting features. The inner tray sides can be joined by gussets to the tray sides to reinforce the tray sides. The top surfaces of the triangular tray modules can also have stand-off engagement structures (not shown). In FIGS. 13 A-D, the top surface of the tray side nearest 1311, and in some views the top surface between tray side 1311 and inner tray side 1301 can be closed (similar to closed top surface portions of 140 and 142 in FIG. 1) to prevent plant development along the top side of the tray. FIGS. 13A-D can include structures like 1348, 1350, 1352, 1354, or 1356 that can include straight line portions that can include the top surface of the tray module and that can have straight line portions joined to adjacent tray sides and or corners. For example, FIG. 13A illustrates structures like 1352 and 1354 that can include the top surface of a tray module and that can have straight line portions that can be joined to adjacent tray sides such as 1311 and 1312. Structures such as 1350 that can include the top surface of a tray module and can have straight line portions can be joined to a corner and an opposite side such as but not limited to corner 1316 joined by 1350 with side 1313 (FIG. 13A); structures like 1350 can be joined to corners 1306 and 1316 and joined with opposite inner tray sides like 1303 and tray side 1313 (FIG. 13B); structures like 1350 can be joined to corner 1306 and can be joined to an opposite inner tray side like 1303 (FIG. 13C), or structures like 1350 can join corner 1306 with tray side 1313. In FIG. 13A, region 1317 illustrates a portion of tray side 1312 where structure such as 1354 and 1356 can be joined to each other and can be joined together at tray side 1312. The joining can be by fusion, welding, or as formed by molding. In FIG. 13 C, region 1315 illustrates a portion of the inner tray side 1302 where structures such as 1354 and 1356 can be joined to each other and can be joined to an inner tray side and a gusset 1366. FIG. 13D illustrates and embodiment of a tray module having two inner tray sides 1301 and 1302 and outer tray sides 1311, 1312, and 1313. FIG. 13B and FIG. 13C can have the tray sides 1311, 1312, and 1313 and can have inner trays sides 1301, 1302, and 1303. The inner tray sides in FIG. 13B and FIG. 13C can have a corner such as 1306 and opposite side 1303 spanned by a structure like 1350 comprising the top surface. FIG. 13 B illustrates that the structures comprising the top surface of a tray module such as 1352 can join adjacent tray sides like 1311 and 1312 and adjacent inner tray sides like 1301 and 1302 by a straight line portion of 1352. In FIG. 13B the structure 1352 and/or 1354, which can be a brace or rib, can join adjacent tray sides like 1311 and 1312 and inner tray sides like 1301 and 1302 directly by a straight line portion 1352 and/or 1354. FIG. 13 C illustrates an embodiment where the structures comprising the top surface of a tray module such as 1352 and 1354 can join adjacent inner tray sides like 1301 and 1302 by the straight line portion without directly joining by the straight line portion of 1352 or 1354 the corresponding tray sides 1311 or 1312. FIG. 13C further illustrates that inner tray side 1301 can be joined to tray side 1311 by gusset or rib 1368 and that inner tray side 1302 can be joined to tray side 1312 by gusset or rib 1366. FIG. 13C illustrates that gusset or rib 1368 (and similarly for 1366) is not a straight line portion or extension of structure 1354 or other top surface portion. FIG. 13D illustrates that openings such as 1330 (e.g. as shown in FIG. 13A and FIG. 13B; not shown for clarity in FIG. 13C and FIG. 13D) can be formed by structures including 1348, 1350, 1352, and 1354 that can include the top surface of the tray modules.

Embodiments of the disclosure relate to tray modules and tray assemblies made from interconnected tray modules. The modular tray assemblies can be used in indoor farming with soilless grow media to germinate seeds, develop plants from the germinated seeds, and to harvest the developed plants from grow media atop the tray assembly. Soilless growth media can be supported by the top surface of a tray module or a tray assembly and seeds can be positioned to contact the media. The soilless growth media can be wet with water or a solution containing water such as a nutrient solution. In some embodiments the wet surfaces of the soilless growth media can be adhesively coupled by the water from a water containing solution (e.g. water, nutrient solution, etc.) to the top surface of tray modules or the top surface of tray assemblies. A growth media can be referred to as being "adhesively coupled" by water from a solution containing water to the top surface of a tray module or tray assembly when the growth media wet with the solution containing water remains on the top surface of the tray module or tray assembly for at least 30 seconds when for example the left side of the tray module or tray assembly is lifted from a level flat surface while the right side of the module or assembly remains in contact with the level flat surface (lifting from the left side pivots the module or assembly about the right side which can be the origin). The growth media adhesively coupled by water can remain on the top surface of the tilted tray module or tilted tray assembly having the right side as the origin and flat level surface as the x-axis for at least 30 seconds when the angle between the level surface and the top surface of the tray module or top surface of the tray assembly is between 150 degrees and 90 degrees. In some embodiments of the disclosure the top surface of the braces or ribs of a tray module or tray assembly such as 150 and 152 can be flat. Top surfaces of the braces, ribs, or closed surface that have greater flatness can maximize contact area and adhesive coupling with a growth media compared to top surfaces that are rounded or pointed. Adhesive coupling of the soilless growth media by water to the top surface of a tray module or tray assembly can advantageously eliminate the need and use of grommets and the like on the sides of soilless growth media to couple the media with hooks/tabs onto a support frame. Seeds can be dispersed onto the wet soilless media that is adhesively coupled to the tray top and germinated. Two or more modules or tray assemblies with growth media can be stacked vertically to germinate the seeds. After germination the trays or tray assemblies can be taken from the stack and placed on containers or drip pans for plant development. The tray modules and tray assemblies with growth media retain a flat surface during plant development. A flat surface maintains a uniform separation between the plant canopy and lights above the canopy and contact with circulating air and carbon dioxide. The flat surface of the tray module or tray assemblies also advantageously presents a level surface to a cutting blade or cutting device in a harvester enabling greater uniformity in the size and position of cut on the shoot of harvested crops.

The tray modules making up a tray assembly can be interchangeable. The tray modules making up a tray assembly can be made from the same mold design. Having a single mold design can reduce production costs for making tray modules and can reduce the inventory of replacement parts needed to repair tray assemblies. Except for molding flashing and the like, the tray modules can be mirror images of each other.

Example 1

This example describes a tray assembly built from individual tray modules and demonstrates the flatness of the tray assembly prototype.

The tray assembly is similar to the tray assembly 1000 shown in FIG. 10 and included four tray modules as depicted in FIG. 7 that were joined together at the connecting features using fasteners. The connecting features were openings/holes through the tray side walls. The tray side walls of adjacent trays were joined together using nuts, washers, and bolts as reversible fasteners (See 1102 in FIG. 11). Two stiffing strips (e.g. see 1136 and 1140, in FIG. 11) were positioned between joined tray modules. The stiffening strips included openings that were aligned with the connecting features on the tray side walls. The bolts passed from one tray side wall opening, through the stiffening strip opening, through the second tray side wall opening and were secured with a nut that was tightened. In the center of the tray assembly, each of the stiffening strips were notched to allow them to cross one another while providing a continuous portion of each strip to support the tray modules.

The unloaded tray assembly was 5 feet by 5 feet (1.53 meters by 1.53 meters) and was substantially flat when supported on the tray sides. The center of the tray assembly did not include a center support that was in contact with a lower surface below the tray assembly. Each of the tray modules included stand-offs and handles. Notches/slits were formed in the container that engaged the stand-offs.

Compared to the unloaded tray (0 centimeter downward deflection at the tray assembly center as measured by a straight edge positioned across the tray assembly) with no center support, when the tray assembly was loaded with 70 pounds (31.75 kilograms) of mass that was distributed across the center portion (less than 1.25 feet or 34 centimeters radius from the tray assembly center) of the tray assembly, the tray assembly center deflected downward 0.19 inches (0.48 centimeters).

The results of this example shows that a tray assembly built from joined tray module s remains substantially flat when loaded with mass near its unsupported center.

A tray or tray assembly that maintains its flatness when loaded with harvestable plants provides a uniform surface for harvesting with a cutting device and can advantageously provide a more uniform product height than a tray that has a non-uniform top surface or that sags due to the mass of the plants.

These, and other, aspects of the disclosure will be better appreciated and understood when considered in conjunction with the following description and the accompanying drawings. The following description, while indicating various embodiments of the disclosure and numerous specific details thereof, is given by way of illustration and not of limitation. Many substitutions, modifications, additions or rearrangements may be made within the scope of the disclosure, and the disclosure includes all such substitutions, modifications, additions or rearrangements.

The following clauses define particular aspects and embodiments of the disclosure.

Clause 1. A tray module comprising: a top surface, a bottom surface, and openings with walls between the top surface and the bottom surface; tray sides extending below the top surface, the tray sides form a tray side perimeter; the tray sides comprise a first tray side, a second tray side, a third tray side, and a fourth tray side; the second tray side and the third tray side are opposite one another, the fourth tray side is opposite the first tray side; the second tray side, the third tray side, and the fourth tray side comprise connecting features; said tray module comprises one or more stand-offs within the tray side perimeter, said stand-offs extend away from the top surface and beyond a bottom edge of the tray sides, said stand-offs have a stand-off bottom surface; said tray module comprises two or more structures comprising the top surface that have a straight line portion that join adjacent tray sides, join opposite corners, or any combination of these, said structures comprising the top surface form the openings with walls between the top surface and the bottom surface; one or more stand-off engagement structures on the top surface, said stand-off engagement structures aligned with the bottom surface of the one or more stand-offs; said stand-off engagement structures retain the bottom surface of stand-offs from another tray module positioned atop the tray module.

Clause 2. The tray module of clause 1 further comprising inner tray sides extending below the top surface of the tray, the inner trays sides form an inner tray side perimeter, the inner tray side perimeter is smaller than the tray side perimeter; the inner tray sides comprise a first inner tray side, a second inner tray side, a third inner tray side, and a fourth inner tray side; the first inner tray side is joined to the first tray side, the first inner tray side comprises one or more of the stand-offs that extend beyond the bottom edge of the first tray side; the second inner tray side comprises an opening opposite the connecting features of the second tray side and the second inner tray side is joined to the second tray side, the second inner tray side comprises one or more of the stand-offs that extend beyond the bottom edge of the second tray side; the third inner tray side comprises an opening opposite the connecting features of the third tray side and the third inner tray side is joined to the third tray side, the third inner tray side comprises one or more of the stand-offs that extend beyond the bottom edge of the third tray side; the fourth inner tray side comprises an opening opposite the connecting features of the fourth tray side and the fourth inner tray side is joined to the fourth tray side, the fourth inner tray side comprises one or more of the stand-offs that extend beyond the bottom edge of the fourth tray side.

Clause 3. The tray module of clause 2 wherein said two or more structures comprising the top surface that have the straight line portion are: i) joined to adjacent tray sides, joined to diagonally opposite corners of adjacent tray sides, or any combination of these; ii) joined to adjacent tray sides and adjacent inner tray sides, joined to diagonally opposite corners of adjacent tray sides and adjacent inner tray sides, or any combination of these; or, iii) joined to adjacent inner tray sides, joined to diagonally opposite corners of adjacent inner tray sides, or any combination of these, and wherein the inner tray sides are joined by one or more gussets to the tray sides.

Clause 4. The tray module as in any one of clauses 1-3, wherein the stand-offs are non-nesting stand-offs.

Clause 5. The tray module as in any one of clauses 2-4, wherein the two or more structures comprising the top surface that form the openings with walls between the top surface and the bottom surface are continuous ribs joined to the inner tray sides at the stand-offs and the stand-offs are joined to a gusset that is joined to the tray side.

Clause 6. The tray module as in any one of clauses 2-5, wherein the two or more structures comprising the top surface are continuous ribs joined between corners of the inner tray sides Clause 7. The tray module as in any one of clauses 2-6, wherein the inner tray sides are separated from the tray sides, said inner tray sides are joined to the tray sides by gussets.

Clause 8. The tray module as in any one of clauses 2-7, wherein the ribs that span between inner tray sides are joined to the stand-offs, joined to the corners of inner tray sides, or are joined to both the stand-offs and the corners of the inner tray sides.

Clause 9. The tray module as in any one of clauses 2-8, wherein the stand-offs are positioned at the center of the inner tray side surfaces.

Clause 10. The tray module as in any one of clauses 2-9 wherein the top surface between the first tray side and the first inner tray side is closed.

Clause 11. The tray module as in any one of clauses 1-10, wherein the openings between the top surface and the bottom surface comprise walls wherein at least one wall of said openings have a wall thickness measured from the tray top surface to any bottom surface of the opening, said wall thickness is less than the thickness of any tray side measured from the tray top surface to the tray side bottom edge surface.

Clause 12. The tray module as in any one of clauses 1-11, wherein said stand-off engagement structures retain the bottom surface of a stand-off from another tray module positioned above the top surface of the tray module.

Clause 13. A tray assembly comprising the tray module as in any one of clauses 1-12 and further comprising a second tray module as in any one of the corresponding clauses 1-12, the second tray module joined to the second tray side, or the third tray side, or the fourth tray side of the tray module to form the tray assembly.

Clause 14. The tray assembly of clause 13 further comprising a stiffening strip between adjacent joined tray modules.

Clause 15. The tray assembly as in any one of clauses 13-14 comprising two stiffening strips, one or both of said stiffening strips are notched, and the stiffening strips cross.

Clause 16. The tray assembly as in any one of clauses 13-15 wherein the tray module and second tray module are interchangeable.

Clause 17. The tray module as in any one of clauses 1-16 wherein the top surface of one or more of the braces, ribs, or closed top surfaces are flat.

Clause 18. The tray module as in any one of clauses 1-16 wherein said stand-off engagement structures are positioned above the tray side bottom edge surface.

Clause 19. The tray assembly as in any one of clauses 13-16, wherein the stiffening strip is retained by a clasp and fasteners, said fasteners engaging connecting features of the clasp, said clasp captures the bottom edge of the tray sides and the stiffening strip.

Clause 20. The tray module as in any one of clauses 1-18 wherein the tray sides comprise a recess for one half the thickness of the stiffening strip.

Clause 21. A tray module comprising: a top surface, bottom surface, and openings with walls between the top surface and the bottom surface; the top surface has a triangular shape and the tray sides form a triangle with a tray side perimeter; the tray sides comprise a first tray side, a second tray side, and a third tray side, an end portion of the first tray side is adjacent to and joined to an end portion of the second tray side and the opposite ends of the third tray side are joined to and span between the free ends of the first tray side and the second tray side; the second tray side and the third tray side comprise connecting features; the tray module further comprises stand-offs within the tray side perimeter, said stand-offs extend away from the top surface and beyond a bottom edge of the tray sides and said stand-offs have a stand-off bottom surface; said tray module has one or more stand-off engagement structures on the top surface, said stand-off engagement structures aligned with the bottom surface of the one or more stand-offs; said stand-off engagement structures retain the bottom surface of stand-offs from another tray module positioned atop the tray module.

Clause 22. The tray module of clause 21 further comprising inner tray sides extending below the top surface, said inner tray sides are connected to the top surface; the inner trays sides form an inner tray side perimeter, the inner tray side perimeter is smaller than the tray side perimeter; the inner tray sides comprise a first inner tray side, a second inner tray side, and a third inner tray side; the first inner tray side is joined to the first tray side, the first inner tray side comprises one or more of the stand-offs that extend beyond the bottom edge of the first tray side; the second inner tray side comprises an opening opposite the connecting features of the second tray side and the second inner tray side is joined to the second tray side, the second inner tray side comprises one or more of the stand-offs that extend beyond the bottom edge of the second tray side; the third inner tray side comprises an opening opposite the connecting features of the third tray side and the third inner tray side is joined to the third tray side, the third inner tray side comprises one or more of the stand-offs that extend beyond the bottom edge of the third tray side.

Clause 23. The tray module of clause 22, wherein said two or more structures comprising the top surface that have the straight line portion are: i) joined to adjacent tray sides, joined to a corner between adjacent tray sides and the opposite tray side, or any combination of these; ii) joined to adjacent tray sides and adjacent inner tray sides, joined to a corner between adjacent tray sides and the opposite tray side and joined to the a corner between adjacent inner tray sides and the opposite inner tray side, or any combination of these; or, iii) joined to adjacent inner tray sides, joined to the corner between adjacent inner tray sides and the opposite inner tray side with gussets joining the inner tray sides to the tray sides, or any combination of these with gussets joining the inner tray sides to the tray sides.

Clause 24. The tray module of as in any one of clauses 21-23, wherein the openings between the top surface and the bottom surface of the opening comprise walls wherein at least one wall of said openings have a wall thickness measured from the tray top surface to any bottom surface of the opening, said wall thickness is less than the thickness of any tray side measured from the tray top surface to the tray side bottom edge surface.

Clause 25. A tray assembly comprising a tray module as in any one of clauses 21-24 and further comprising a second tray module, the second tray module joined to the second side or third side of the tray module to form a tray assembly, the second tray module is interchangeable with the tray module.

Clause 26. The tray assembly of clause 25 further comprising a stiffening strip between the tray module and the second tray module that are joined together.

Clause 27. The tray assembly as in any one of clauses 25-26 wherein the stiffening strip is retained by a clasp and fasteners, said clasp captures the bottom edge of the tray sides and the stiffening strip.

Clause 28. The tray module as in any one of clauses 21-27 further comprising a handle on the first tray side.

Clause 29. The tray module as in any one of clauses 21-28 wherein said stand-off engagement structures are positioned above the tray side bottom edge surface.

Clause 30. The tray module as in any one of clauses 21-29 wherein the top surface nearest the first tray side is closed.

Clause 31. The tray assembly as in any one of clauses 25-30 comprising three or more tray modules and wherein the tray modules are interchangeable.

Clause 32. The tray assembly as in any one of clauses 13-16, 20, or 25-31 further comprising a soilless grow medium on the top surface.

Clause 33. The tray assembly as in clause 32, wherein the soilless grow medium is adhesively coupled by a water comprising solution to the tray assembly top surface.

Clause 34. The tray module as in any one of clauses 1-12, 17-18, 20-24, or 28-30 further comprising a soilless grow medium.

Clause 35. The tray module as in clause 34, the soilless growth medium adhesively coupled to the tray module top surface by a solution comprising water.

Clause 36. A tray module comprising: a top surface, a bottom surface, and openings with walls between the top surface and the bottom surface; tray sides extending below the top surface, the tray sides form a tray side perimeter and the tray sides form a geometric shape; the tray sides comprise connecting features; said tray module comprises one or more stand-offs within the tray side perimeter, said stand-offs extend away from the top surface and beyond a bottom edge of the tray sides, said stand-offs have a stand-off bottom surface; said tray module comprises two or more structures comprising the top surface that have a straight line portion that joins adjacent tray sides, join a corner and an opposite tray side, or any combination of these, said structures comprising the top surface form the openings with walls between the top surface and the bottom surface; one or more stand-off engagement structures on the top surface, said stand-off engagement structures aligned with the bottom surface of the one or more stand-offs; said stand-off engagement structures retain the bottom surface of stand-offs from another tray module positioned atop the tray module.

Clause 37. The tray module of clause 36 further comprising one or more inner tray side extending below the top surface of the tray and that has an inner tray side perimeter, the inner tray side perimeter is smaller than the tray side perimeter; the inner tray sides comprise one or more of the stand-offs within the tray side perimeter and that extend beyond the bottom edge of the one or more tray sides; the inner tray sides comprise openings opposite the connecting features of the tray sides; the inner tray side joined to a tray side.

Clause 38. The tray module of clause 37 wherein said two or more structures comprising the top surface that have the straight line portion are: i) joined to adjacent tray sides, joined to corners between adjacent connected tray sides, or any combination of these; ii) joined to adjacent tray sides and adjacent inner tray sides, joined to corners between adjacent connected tray sides and joined to corners between adjacent connected inner tray sides, or any combination of these; or, iii) joined to adjacent inner tray sides, joined to corners between adjacent inner tray sides, or any combination of these, and wherein the inner tray sides are joined by one or more gussets to the tray sides.

Clause 39. The tray module as in any one of clauses 36-38, wherein the openings between the top surface and the bottom surface comprise walls wherein at least one wall of said openings have a wall thickness measured from the tray top surface to any bottom surface of the opening, said wall thickness is less than the thickness of any tray side measured from the tray top surface to the tray side bottom edge surface.

Clause 40. A tray assembly comprising a tray module as in any one of clauses 36-39 and further comprising a second tray module, the second tray module joined to a side of the tray module to form a tray assembly, the second tray module is interchangeable with the tray module.

Clause 41. The tray assembly of clause 40 further comprising a stiffening strip between the tray module and the second tray module.

Clause 42. The tray assembly as in any one of clauses 40-41 wherein the stiffening strip is retained by a clasp and fasteners, said clasp captures the bottom edge of the tray sides and the stiffening strip.

Clause 43. The tray module as in any one of clauses 36-42 further comprising a handle on a tray module side.

Clause 44. The tray module as in any one of clauses 36-43 wherein said stand-off engagement structures are positioned above the tray side bottom edge surface.

Clause 45. The tray module as in any one of clauses 36-43 wherein a portion of the top surface nearest the tray side is closed Clause 46. The tray assembly as in any one of clauses 40-42 wherein any of the tray modules are interchangeable with each other.

Clause 47. The tray assembly as in any one of clauses 36-46 further comprising a soilless grow medium.

Clause 48. The tray assembly as in clause 47, wherein the soilless growth medium is adhesively coupled to the tray module top surface by a solution comprising water.

Clause 49. A tray module comprising: a top surface, a bottom surface, and openings with walls between the top surface and the bottom surface;

tray sides extending below the top surface, the tray sides form a tray side perimeter; the tray sides comprise a first tray side, a second tray side, a third tray side, and a fourth tray side; the second tray side and the third tray side are opposite one another, the fourth tray side is opposite the first tray side; the second tray side, the third tray side, and the fourth tray side comprise connecting features;

said tray module comprises one or more stand-offs within the tray side perimeter, said stand-offs have a stand-off bottom surface that extends away from the top surface and beyond a tray side bottom edge surface;

said tray module comprises two or more structures comprising the top surface that comprise a straight line portion that span between adjacent tray sides and form the openings with walls between the top surface and the bottom surface;

one or more stand-off engagement structures, said stand-off engagement structures aligned with the stand-off bottom surface of the one or more stand-offs; said stand-off engagement structure retains a stand-off bottom surface from another tray positioned atop the tray module.

Clause 50. The tray module of clause 49 further comprising inner tray sides extending below the top surface of the tray, the inner trays sides form an inner tray side perimeter, the inner tray side perimeter is smaller than the tray side perimeter; the inner tray sides comprise a first inner tray side, a second inner tray side, a third inner tray side, and a fourth inner tray side; the first inner tray side is joined to the first tray side, the first inner tray side comprises one or more of the stand-offs that extend away from the bottom edge of the first tray side; the second inner tray side comprises an opening opposite the connecting features of the second tray side and the second inner tray side is joined to the second tray side, the second inner tray side comprises one or more of the stand-offs that extend away from the bottom edge of the second tray side; the third inner tray side comprises an opening opposite the connecting features of the third tray side and the third inner tray side is joined to the third tray side, the third inner tray side comprises one or more of the stand-offs that extend away from the bottom edge of the third tray side; the fourth inner tray side comprises an opening opposite the connecting features of the fourth tray side and the fourth inner tray side is joined to the fourth tray side, the fourth inner tray side comprises one or more of the stand-offs that extend away from the bottom edge of the fourth tray side.

Clause 51. The tray module of clause 50 wherein said two or more structures comprising the top surface that have the straight line portion are: i) joined to adjacent tray sides, joined to diagonally opposite corners of adjacent tray sides, or any combination of these; ii) joined to adjacent tray sides and adjacent inner tray sides, joined to diagonally opposite corners of adjacent tray sides and diagonally opposite corners of adjacent inner tray sides, or any combination of these; or, iii) joined to adjacent inner tray sides, joined to diagonally opposite corners of adjacent inner tray sides, or any combination of these, wherein the inner tray sides are joined by one or more gussets to the tray sides.

Clause 52. The tray module as in any one of clauses 49-51, wherein the openings between the top surface and the bottom surface comprise walls wherein at least one wall of said openings have a wall thickness measured from the tray top surface to any bottom surface of the opening, said wall thickness is less than the thickness of any tray side measured from the tray top surface to the tray side bottom edge surface.

Clause 53. The tray module as in any one of clauses 49-52 wherein the two or more structures comprising the top surface that form the openings with walls between the top surface and the bottom surface are continuous ribs, said ribs joined to the inner tray sides at the one or more stand-offs and the stand-offs are joined to a gusset that is joined with a tray side.

Clause 54. The tray module as in any one of clauses 49-53 wherein the stand-offs are positioned at the center of the inner tray sides and at the corners of the inner tray sides.

Clause 55. The tray module as in any one of clauses 49-54 wherein a portion of the top surface between the first tray side and the first inner tray side is closed.

Clause 56. The tray module as in any one of clauses 49-55 wherein the stand-offs are non-nesting.

Clause 57. The tray module as in any one of clauses 49-56 further comprising a second tray module, the second tray module joined to the second tray side, or the third tray side, or the fourth tray side of the tray module to form a tray assembly, the second tray module is interchangeable with the tray module.

Clause 58. The tray assembly as in any one of clause 57 further comprising a stiffening strip between adjacent joined tray modules.

Clause 59. The tray assembly as in any one of clauses 57-58, comprising four tray modules joined together.

Clause 60. The tray assembly as in any one of clauses 57-59 comprising two stiffening strips, one or more of said stiffening strips are notched, and the stiffening strips cross.

Clause 61. The tray assembly as in any one of clauses 57-60 wherein any of the tray modules are interchangeable with each other.

Clause 62. The tray assembly as in any one of clauses 57-61 wherein the top surface between the first tray side and the first inner tray side of one or more tray modules of the tray assembly is closed.

Clause 63. The tray module or tray assembly as in any one of clauses 49-61 further comprising a soilless grow medium.

Clause 64. The tray module or tray assembly as in any one of clauses 49-63, wherein the soilless growth medium is adhesively coupled to the top surface of the tray module or top surface of the tray assembly by a solution comprising water.

Clause 65. A tray module comprising: a top surface, a bottom surface, and openings with walls between the top surface and the bottom surface;

tray sides extending below the top surface, the tray sides form a triangle with a tray side perimeter; the tray sides comprise a first tray side, a second tray side, and a third tray side, the first tray side is adjacent to the second tray side, and the third tray side spans between the first tray side and the second tray side; the second tray side and the third tray side comprise connecting features;

one or more stand-offs within the tray side perimeter, said stand-offs have a stand-off bottom surface that extends away from the top surface and beyond a tray side bottom edge surface;

said tray module comprises two or more structures comprising the top surface that comprise a straight line portion that spans between adjacent tray sides and forms the openings with walls between the top surface and the bottom surface;

one or more stand-off engagement structures, said stand-off engagement structures aligned with the bottom edge surface of the one or more stand-offs; said stand-off engagement structure retains the bottom surface of a stand-off from another tray positioned atop the tray module.

Clause 66. The tray module of clause 65 further comprising inner tray sides extending below the top surface, the inner trays sides form an inner tray side perimeter, the inner tray side perimeter is smaller than the tray side perimeter; the inner tray sides comprise a first inner tray side, a second inner tray side, and a third inner tray side; the first inner tray side is joined to the first tray side, the first inner tray side comprises one or more stand-offs that extend beyond the bottom edge of the first tray side; the second inner tray side comprises an opening opposite the connecting features of the second tray side and the second inner tray side is joined to the second tray side, the second inner tray side comprises one or more stand-offs that extend beyond the bottom edge of the second tray side; the third inner tray side comprises an opening opposite the connecting features of the third tray side and the third inner tray side is joined to the third tray side, the third inner tray side comprises one or more stand-offs that extend beyond the bottom edge of the third tray side.

Clause 67. The tray module of clause 66 wherein said two or more structures comprising the top surface that have the straight line portion are: i) joined to adjacent tray sides, joined to a corner between adjacent tray sides and the tray side opposite the corner, or any combination of these; ii) joined to adjacent tray sides and adjacent inner tray sides, joined to a corner between adjacent tray sides and the opposite tray side and joined to a corner between adjacent inner tray sides and the opposite inner tray side, or any combination of these; or, iii) joined to adjacent inner tray sides, joined to the corner between adjacent inner tray sides and the inner tray side opposite the corner, or any combination of these, the inner tray sides joined by gussets to the tray sides.

Clause 68. The tray module as in any one of clauses 65-67 wherein the openings between the top surface and the bottom surface comprise walls wherein at least one wall of said openings have a wall thickness measured from the tray top surface to any bottom surface of the opening, said wall thickness is less than the thickness of any tray side measured from the tray top surface to the tray side bottom edge surface.

Clause 69. The tray module as in any one of clauses 65-68 wherein the two or more structures comprising the top surface that form the openings with walls between the top surface and the bottom surface are continuous ribs, said ribs joined to the inner tray sides at the one or more stand-offs and the stand-offs are joined to a gusset that is joined with a tray side.

Clause 70. The tray module as in any one of clauses 65-69 wherein the stand-offs are positioned at the center of the inner tray sides and at the corners of the inner tray sides.

Clause 71. The tray module as in any one of clauses 65-70 wherein a portion of the top surface between the first tray side and the first inner tray side is closed.

Clause 72. The tray module as in any one of clauses 65-71 wherein the stand-offs are non-nesting.

Clause 73. The tray module as in any one of clauses 65-72 further comprising a second tray module, the second tray module joined to the second side or third side of the tray module to form a tray assembly, the second tray module is interchangeable with the tray module.

Clause 74. The tray assembly of clause 73 further comprising a stiffening strip between the tray module and the second tray module.

Clause 75. The tray module or tray assembly as in any one of clauses 73-74 wherein the top surface between the first tray side and the first inner tray side of one or more tray modules of the tray assembly is closed.

Clause 76. The tray assembly as in any one of clauses 73-75 wherein any of the tray modules are interchangeable with each other.

Clause 77. The module or tray assembly as in any one of clauses 65-76 further comprising a soilless grow medium.

Clause 78. The tray module or tray assembly as in any one of clauses 65-77, wherein the soilless growth medium is adhesively coupled to the top surface of the tray module or the tray assembly by a solution comprising water.

Clause 79. The tray module or tray assembly as in any one of clauses 65-78 wherein the top surface between the first tray side and the first inner tray side is closed.

Clause 80. A tray module or tray assembly as in any one of clauses 1-79 comprising one or more molded joints or fused joints, said molded joints or fused joints between one or more closed top surface portions, tray sides, inner tray sides, or top surfaces that have a straight line portion spanning between adjacent tray sides or inner tray sides that form openings with walls between the top surface and the bottom surface.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

It will be apparent to those skilled in the art that various modifications and variations can be made in the method and system of the present disclosure without departing from the spirit or scope of the disclosure. Thus, it is intended that the present disclosure include modifications and variations that are within the scope of the appended claims and their equivalents.

While the disclosure has been described in detail in connection with only a limited number of aspects and embodiments, it should be understood that the disclosure is not limited to such aspects. Rather, the disclosure can be modified to incorporate any number of variations, alterations, substitutions, or equivalent arrangements not heretofore described, but which are commensurate with the scope of the claims. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A tray module for supporting seed germination and plant development, the tray module comprising:

a top surface, a bottom surface, and openings with walls between the top surface and the bottom surface;

tray sides extending from the top surface and below the bottom surface to define a tray side bottom edge surface, the tray sides form a tray side perimeter; the tray sides comprise a first tray side, a second tray side, a third tray side, and a fourth tray side; the second tray side and the third tray side are opposite one another, the fourth tray side is opposite the first tray side;

said tray module comprises one or more stand-offs within the tray side perimeter, said stand-offs have a stand-off bottom surface that extends away from the bottom surface and beyond the tray side bottom edge surface, wherein the one or more stand-offs are inwardly spaced from and connected to an inner surface of the tray sides by structures; and said tray module comprises two or more structures comprising the top surface that comprise a straight line portion that span between adjacent tray sides and form the openings with walls between the top surface and the bottom surface.

2. The tray module of claim 1, further comprising inner tray sides extending below the top surface of the tray, the inner trays sides form an inner tray side perimeter, the inner tray side perimeter is smaller than the tray side perimeter; the inner tray sides comprise a first inner tray side, a second inner tray side, a third inner tray side, and a fourth inner tray side; the first inner tray side is joined to the first tray side, the first inner tray side comprises one or more of the stand-offs that extend away from the bottom edge of the first tray side; the second inner tray side is joined to the second tray side, the second inner tray side comprises one or more of the stand-offs that extend away from the bottom edge of the second tray side; the third inner tray side is joined to the third tray side, the third inner tray side comprises one or more of the stand-offs that extend away from the bottom edge of the third tray side; the fourth inner tray side is joined to the fourth tray side, the fourth inner tray side comprises one or more of the stand-offs that extend away from the bottom edge of the fourth tray side.

3. The tray module of claim 2, wherein said two or more structures comprising the top surface that have the straight line portion are: i) joined to adjacent tray sides, joined to diagonally opposite corners of adjacent tray sides, or any combination of these; ii) joined to adjacent tray sides and adjacent inner tray sides, joined to diagonally opposite corners of adjacent tray sides and diagonally opposite corners of adjacent inner tray sides, or any combination of these; or, iii) joined to adjacent inner tray sides, joined to diagonally opposite corners of adjacent inner tray sides, or any combination of these, wherein the inner tray sides are joined by one or more gussets to the tray sides.

4. The tray module of claim 1, wherein the openings between the top surface and the bottom surface comprise walls wherein at least one wall of said openings have a wall thickness measured from the tray top surface to any bottom surface of the opening, said wall thickness is less than the thickness of any tray side measured from the tray top surface to the tray side bottom edge surface.

5. The tray module of claim 2, wherein the openings between the top surface and the bottom surface comprise walls wherein at least one wall of said openings have a wall thickness measured from the tray top surface to any bottom surface of the opening, said wall thickness is less than the thickness of any tray side measured from the tray top surface to the tray side bottom edge surface.

6. The tray module of claim 3, wherein the two or more structures comprising the top surface that form the openings with walls between the top surface and the bottom surface are continuous ribs, said ribs joined to the inner tray sides at the one or more stand-offs and the stand-offs are joined to a gusset that is joined with a tray side.

7. The tray module of claim 6, wherein the stand-offs are positioned at the center of the inner tray sides and at the corners of the inner tray sides.

8. The tray module of claim 2, wherein a portion of the top surface between the first tray side and the first inner tray side is closed.

9. The tray module of claim 1, wherein the stand-offs are non-nesting.

10. The tray module of claim 2, further comprising a second tray module, the second tray module joined to the second tray side, or the third tray side, or the fourth tray side of the tray module to form a tray assembly, the second tray module is interchangeable with the tray module.

11. The tray assembly of claim 10, further comprising a stiffening strip between the tray module and the second tray module.

12. The tray assembly of claim 11, comprising four tray modules joined together, said tray assembly comprising one or more notched stiffening strips between adjacent joined tray modules.

13. The tray assembly of claim 12, wherein one or more of the stiffening strips has an arched shape.

14. A tray module for supporting seed germination and plant development, the tray module comprising:

a top surface, a bottom surface, and openings with walls between the top surface and the bottom surface;

tray sides extending from the top surface and below the bottom surface to define a tray side bottom edge surface, the tray sides form a triangle with a tray side perimeter; the tray sides comprise a first tray side, a second tray side, and a third tray side; a first end of the first tray side is adjacent to and joined to a first end of the second tray side, a first end of the third tray side is joined to the second end of the first tray side and the second end of the third tray side is joined to the second end of the second tray side, whereby the third tray side spans between the first tray side and the second tray side;

one or more stand-offs within the tray side perimeter, said stand-offs have a stand-off bottom surface that extends away from the bottom surface and beyond the tray side bottom edge surface, wherein the one or more stand-offs are inwardly spaced from and connected to an inner surface of the tray sides by structures; and said tray module comprises two or more structures comprising the top surface that comprise a straight line portion that spans between adjacent tray sides and forms the openings with walls between the top surface and the bottom surface.

15. The tray module of claim 14, further comprising inner tray sides extending below the top surface, the inner trays sides form an inner tray side perimeter, the inner tray side perimeter is smaller than the tray side perimeter; the inner tray sides comprise a first inner tray side, a second inner tray side, and a third inner tray side; the first inner tray side is joined to the first tray side, the first inner tray side comprises one or more stand-offs that extend beyond the bottom edge of the first tray side; the second inner tray side is joined to the second tray side, the second inner tray side comprises one or more stand-offs that extend beyond the bottom edge of the second tray side; the third inner tray side is joined to the third tray side, the third inner tray side comprises one or more stand-offs that extend beyond the bottom edge of the third tray side.

16. The tray module of claim 15, wherein said two or more structures comprising the top surface that have the straight line portion are: i) joined to adjacent tray sides, joined to a corner between adjacent tray sides and the tray side opposite the corner, or any combination of these; ii) joined to adjacent tray sides and adjacent inner tray sides, joined to a corner between adjacent tray sides and the opposite tray side and joined to a corner between adjacent inner tray sides and the opposite inner tray side, or any combination of these; or, iii) joined to adjacent inner tray sides, joined to the corner between adjacent inner tray sides and the inner tray side opposite the corner, or any combination of these, the inner tray sides joined by gussets to the tray sides.

17. The tray module of claim 15, wherein the openings between the top surface and the bottom surface comprise walls wherein at least one wall of said openings have a wall thickness measured from the tray top surface to any bottom surface of the opening, said wall thickness is less than the thickness of any tray side measured from the tray top surface to the tray side bottom edge surface.

18. The tray module of claim 17, further comprising a second tray module, the second tray module joined to the second side or third side of the tray module to form a tray assembly, the second tray module is interchangeable with the tray module.

19. The tray assembly of claim 18, further comprising a stiffening strip between adjacent joined trays.

20. The tray module of claim 16, wherein the top surface between the first tray side and the first inner tray side is closed.

* * * * *